(12) United States Patent
Ajiri

(10) Patent No.: US 8,257,679 B2
(45) Date of Patent: Sep. 4, 2012

(54) ORGANICALLY MODIFIED FINE PARTICLES

(75) Inventor: Tadafumi Ajiri, Sendai (JP)

(73) Assignee: Tohoku Techno Arch Co., Ltd. (JP)

( * ) Notice: Subject to any disclaimer, the term of this patent is extended or adjusted under 35 U.S.C. 154(b) by 110 days.

(21) Appl. No.: 12/510,175

(22) Filed: Jul. 27, 2009

(65) Prior Publication Data

US 2010/0092663 A1 Apr. 15, 2010

Related U.S. Application Data

(62) Division of application No. 11/173,348, filed on Jul. 1, 2005, now Pat. No. 7,803,347.

(30) Foreign Application Priority Data

Jan. 8, 2004 (JP) .................. 2004-003517

(51) Int. Cl.
| | |
|---|---|
| *C01B 13/14* | (2006.01) |
| *C01G 3/02* | (2006.01) |
| *C01G 25/02* | (2006.01) |
| *C01G 23/047* | (2006.01) |
| *C01G 28/00* | (2006.01) |
| *C01G 17/02* | (2006.01) |
| *C01G 19/02* | (2006.01) |
| *C01G 21/02* | (2006.01) |
| *C01G 9/02* | (2006.01) |
| *C01G 49/02* | (2006.01) |
| *C01G 11/02* | (2006.01) |
| *C01G 13/02* | (2006.01) |
| *C01G 51/04* | (2006.01) |
| *C01G 53/04* | (2006.01) |

(52) U.S. Cl. ............ 423/592.1; 423/604; 423/608; 423/610; 423/617; 423/618; 423/619; 423/622; 423/632; 423/594.18; 423/594.19; 977/775; 977/811; 977/900

(58) Field of Classification Search .......... 977/775, 977/811, 900
See application file for complete search history.

(56) References Cited

U.S. PATENT DOCUMENTS

| | | | |
|---|---|---|---|
| 4,923,950 A | 5/1990 | Ravaine et al. | 528/38 |
| 2005/0131107 A1 | 6/2005 | Okei et al. | 532/216 |
| 2006/0251687 A1 | 11/2006 | Lapidot et al. | 424/401 |

OTHER PUBLICATIONS

Ziegler et al, Synthesis of Organic Monolayer-Stabilized Copper Nanocrystals in Supercritical Water, Mar. 29, 2001, J Am. Chem Soc., vol. 123, pp. 7797-7803.*

(Continued)

*Primary Examiner* — Stanley Silverman
*Assistant Examiner* — Justin Bova
(74) *Attorney, Agent, or Firm* — Hayes Soloway P.C.

(57) ABSTRACT

A technique for bonding an organic group with the surface of fine particles such as nanoparticles through strong linkage is provided, whereas such fine particles are attracting attention as materials essential for development of high-tech products because of various unique excellent characteristics and functions thereof. Organically modified metal oxide fine particles can be obtained by adapting high-temperature, high-pressure water as a reaction field to bond an organic matter with the surface of metal oxide fine particles through strong linkage. The use of the same condition enables not only the formation of metal oxide fine particles but also the organic modification of the formed fine particles. The resulting organically modified metal oxide fine particles exhibit excellent properties, characteristics and functions.

41 Claims, 15 Drawing Sheets

OTHER PUBLICATIONS

Mousavand et al, Supercritical Hydrothermal Synthesis of Organic Inoranic Biomolecule Hybrid Nano Particles, Joint 20th AIRAPT Jun. 27, 2005.*

"Formation of Ordered Monolayer of Anionic Silica Particles on a Cationic Molecular Layer" Yonezawa et al., Chemistry Letter, 1998, pp. 689-690.

"Molecular Imprinting of Azobenzene Carboxylic Acid on a TiO2 Ultrathin Film by the Surface Sol-Gel Process" Lee et al., Langmuir, 1998, vol. 14, 2857-2863.

"Alternate Molecular Layers of Metal Oxides and Hydroxyl Polymers Prepared by the Surface So-Gel Process" Ichinose et al., Advanced Materials, 1998, 10, No. 7, pp. 535-539.

"Molecular Imprinting of Protected Amino Acids in Ultrathin Multilayers of TiO2 Gel" Lee et al., Chemistry Letters, 1998, pp. 1193-1194.

"Chemical Coupling of Peptides and Proteins to Polysaccharides by Means of Cyanogen Halides" Axen et al., Nature, vol. 214, 1967, pp. 1302-1304.

"Supercritical Fluid Fabrication of Metal Nanowires and Nanorods Templated by Multiwalled Carbon Nanotubes" Ye et al., Advanced Materials, 15, No. 3, 2003, pp. 316-319.

"Decorating Catalytic Palladium Nanoparticles on Carbon Nanotubes in Supercritical Carbon Dioxide" Ye et al., Chem. Commun., 2003, pp. 642-643.

"Synthesis of Organic Monolayer-Stablilized Cooper Nanocrystals in Supercritical Water" Ziegler et al., J. Am. Chem. Soc., 2001, 123, pp. 7797-7803.

"Inorganic/Polymer Nano Interface Control" Polymer Frontier 21, Series 15, 2003, p. 3-25.

* cited by examiner

Tube bomb type batch reactor

Reaction Mechanism a) MnO$_2$ (No Surface Modification)   b) In-situ Surface Modification a) with no surface modification b) in situ Modification on Synthesis of MnO2 particles Synthesis of MnO2 Nanoparticles
and in-situ Surface Modification a) 400°C
(No Modifier)

b) 200°C c) 300°C d) 400°C

} Water
} Chroloform

Synthesis of CeO2 Nanoparticles
and in-situ Surface Modification

ORGANICALLY MODIFIED FINE PARTICLES

CROSS REFERENCE TO RELATED APPLICATION

This Application is a divisional of U.S. application Ser. No. 11/173,348, filed Jul. 1, 2005 now U.S. Pat. No. 7,803,347.

BACKGROUND OF THE INVENTION

1. Field of the Invention

The present invention relates to organically modified fine particles having hydrocarbon strongly bound to the surface of fine particles, particularly, organically modified metal oxide fine particles, a process for producing the same, and further a recovery or collection method of fine particles such as nanoparticles, and applied techniques thereof.

2. Description of the Related Art

Fine particles, particularly, particles of nanometer size (nanoparticles) are expected to realize a technology satisfying requests of a higher precision, a smaller size and a lighter weight than in the current condition for all materials and products because of a variety of unique excellent properties, characteristics and functions thereof. Therefore, nanoparticles are attracting attentions as a material enabling the higher function, higher performance, higher density, and higher preciseness of industrial materials, pharmaceutical and cosmetic materials and the like such as ceramic nanostructure modified material, optical functional coating material, electromagnetic shielding material, secondary battery material, fluorescent material, electronic part material, magnetic recording material, and abrasive material, and also as a 21st century material. There is a lot of attention from the industrial world being given thereto, because a series of discoveries such as onset of extra-high functionalities or new physical properties by the quantum size effect of the nanoparticles, and syntheses of new materials have been made in the recent basic researches for the nanoparticles. However, practical application of the nanoparticles requires addition of unique functions to the respective fine particles, and to that end, establishment of a technique for modifying the surface of particles is desired for enabling the addition of the functions. Organic modification is convenient for adding stably usable and applicable functions to fine particles, particularly nanoparticles, and a modification through strong bond is particularly demanded.

Many reports for organic/inorganic composite materials and syntheses thereof have been disclosed up to now, and researches for organic modification of inorganic particles have been also made, each of which intended to carry out a reaction in an organic solvent for the organic modification. A technique for reacting an organic material with fine particles in a reaction field or water while synthesizing the particles in water or an aqueous solution is not known. For the surface modification of particles, many techniques for modifying the surface of inorganic particles in an organic solvent are known. However, particles of nano-size are easy to coagulate, and a pretreatment such as use of a surface active agent is particularly needed for dispersing the particles synthesized in water to an organic solvent. As mentioned above, no report has been made for the technique for modifying the surface of particles while synthesizing the particles in water.

As a method for in-situ surface modification, reversed micelle method, hot soap method, and the like have been reported. In the reversed micelle method, water is suspended to an oil phase by use of a surface active agent to generate a reversed micelle, and a reactive substrate is added thereto to reactively crystallize it. The metal oxide particles generated in the suspended water phase are stabilized by the surface active agent to stably disperse nanoparticles, in which the surface active agent is in a state adsorbed by the particle surface without a linkage by reaction. In the hot soap method, the above method is performed at high temperature by use of only the surface active agent without oil phase. This method is a technique using the effect that an aqueous solution of metal salt to be reacted is rapidly supplied with stirring and reactively crystallized, while the circumferential surface active agent is adsorbed thereto. The cases reported up to now for the organic modification involve adsorption of alkanethiol, but not reactive modification.

There are frequently reported that high-temperature, high-pressure water forms a homogeneous phase also with an organic material, and water functions as an acid or basic catalyst in a high-temperature, high-pressure field to progress an organic synthetic reaction even under no catalyst. However, no method for a reaction between an inorganic material and an organic material is reported.

It is known that highly crystalline particles of nano-size can be synthesized by adapting supercritical water as a reaction field for hydrothermal synthesis. However, there is no report for modification of the surface of the produced nanoparticles in this reaction field, or synthesis of organically modified particles by a reaction with an organic material.

A technique for performing an in-situ surface modification simultaneously with CVD in a supercritical fluid is also known, in which alkanethiol or alcohol is made coexist in a reaction field for synthesizing metal nanoparticles by CVD in the supercritical fluid, taking reference to the above-mentioned hot soap method or the like. It is reported that the growth of particles can be inhibited to generate particles of nanometer according to this technique. For the CVD technique, it is reported that the reduction reaction and surface modification by alkanethiol simultaneously occur, and the resulting product is metal Cu having an alkanethiol-coordinated structure. It is also reported to produce nanoparticles by performing the synthesis in the presence of alkanethiol similarly to the above by use of a reducing agent in supercritical water, thereby coordinating the thiol group with metal nanoparticles to inhibit the growth of particles. In case of the alcohol, it is shown in a part of the result that not only orientation but also linkage was caused to perform in-situ surface modification in the reaction filed. However, this is caused not by the reactive crystallization in supercritical "water", but by only a technique belonging to reactive in-situ surface reforming method in an organic solvent.

A surface treatment of glass or silica gel in water is well known, but this method is based on CNBr activation or epoxy activation. Since each of the CNBr method and the epoxy activation method is carried out in an alkaline solution, particles of about nanometer (nm) are entirely dissolved. Therefore, these known reactions cannot be used for the surface modification of oxide nanoparticles in water.

Conventional organic modification methods will be collectively described.

1) Synthesis of Organic-Inorganic Composite Material

Silane coupling is given as a general method for modifying a metal oxide surface. (Polymer Frontier 21 Series 15 "Inorganic/Polymer Nano Interface Control", edited by Society of Polymer Science, pp. 3-23, NTS, 2003). There are researches for syntheses of organic/inorganic composite materials ["Formation of Ordered Monolayer of Anionic Silica Particles on a Cationic Molecular Layer", T. Yonezawa, S. Onoue, and T. Kunitake, Chem. Lett., No. 7, 689-690 (1998); Molecular Imprinting of Azobenzene Carboxylic Acid on a TiO2 Ultrathin Film by the Surface Sol-Gel Process", S.-W. Lee, I. Ichinose, T. Kunitake, Langmuir, Vol. 14, 2857-2863 (1998); "Alternate Molecular Layers of Metal Oxides and Hydroxyl Polymers Prepared by the Surface Sol-Gel Process", I. Ichinose, T. Kawakami, T. Kunitake, Adv. Mater., Vol. 10, 535-539 (1998); and "Molecular Imprinting of Protected Amino Acids in Ultrathin Multilayers of TiO2 Gel", S. W. Lee, I. Ichinose, T. Kunitake, Chem. Lett., No. 12., 1993-1994 (1998)]. Surface modifications of oxides in water are also known. Techniques for surface-modifying glass or silica gel in water include CNBr activation or epoxy activation, in which CNBr or epoxy is reacted with OH on the surface to give the functional group of the CN or epoxy, and an intended functional group is introduced through it. However, such a reaction requires setting of pH and addition of a catalyst, and involves generation of an acid as a product. Since these activations are carried out in an alkaline solution, all particles of about nm are dissolved, and it is therefore impossible to perform the surface modification of oxide nanoparticles in water by use of these known reactions (Rolf Axen, Jerker Porath, Sverker Embvack, "Chemica Coupling of Peptides and Proteins to Polysaccharides by Means of Cyanogen Halides", Nature, Vol. 214, 1967, pp. 1302-1304). In every method described above, the organic modification depends on a reaction in an organic solvent. Particles of nano-size are easy to coagulate because of high surface energy. A solution method such as sol-gel process or hydrothermal process is effective, as shown in FIG. 1, in synthesizing particles of 10 nm or less. However, the particles synthesized in a solvent are firmly coagulated, when taken out and dried, and it is extremely difficult to redisperse them in an organic solvent. The solvent must be changed to the organic solvent stepwise. Particularly, the nanoparticles synthesized in water frequently have hydrophilic groups, and a pretreatment such as use of a surface active agent is needed for dispersing them to an organic solvent. Accordingly, the technique for surface-modifying nanoparticles in situ while synthesizing them is important for synthesis of nano-particles of 50 nm or less.

2) Technique for Performing In-Situ Surface Modification

Reversed Micelle Method

Water is suspended in an oil phase by use of a surface active agent to form a reversed micelle, and a reactive substrate is added thereto to reactively crystallize it. For example, CdS nanoparticles and $NaNO_3$ can be generated by mixing an aqueous solution of $Cd(NO_3)_2$ with micelle of $Na_2S$. The CdS nanoparticles can be stabilized by supplying a stabilizing agent such as alkanethiol. The surface active agent is in a state adsorbed to the surface without a linkage by reaction (A) New Technology for Production, Evaluation, Application and Equipment of Nanoparticles", pp. 16-19, 2002, published by CMC). Recently, a method using supercritical carbon dioxide as solvent has been also reported (Ye, X. R., Lin, Y. Wang, C., Wai, C. M., Adv. Materials, 2003, 15, 316; and Ye, X. R., Lin, Y. Wang, C., Wai, C. M., Chem. Comm., 2003, 642).

Hot Soap Method

The above-mentioned method is carried out at high temperature by use of only a surface active agent without oil phase. An aqueous solution of metal salt to be reacted is rapidly supplied with stirring and reactively crystallized, while the circumferential surface active agent is adsorbed thereto (A)"New Technology for Production, Evaluation, Application and Equipment of Nanoparticles", pp. 19-21, 2002, published by CMC). Most of the cases reported up to now are based on adsorption of alkanethiol, and no reactive modification has been practiced.

In-Situ Surface Modification in Supercritical Fluid by Reactive Crystallization

A method for performing an organic modification simultaneously with thermal decomposition CVD (chemical vapor deposition) in a supercritical fluid is also proposed. Particularly, an article for a surface modification performed in coexistence of alkanethiol in a supercritical hydrothermal synthesis (Technoarch's Patent) field is disclosed. When the coexistence of hexane thiol with an aqueous solution of $Cu(NO_3)_2$ laid in a supercritical state results in synthesis of Cu particles by reduction and stabilization thereof by hexane thiol in situ. In this case, the thiol acts as a reducing agent to coordinate the hexane thiol with the surface of the generated Cu nanoparticles. This is a well-known coordination with metal (Kirk J. Ziegler, R. Christopher Doty, Keith P. Johnston, and Brian A. Korgel, "Synthesis of Organic Monolayer-Stabilized Copper Nanocrystals in Supercritical Water", J. Am. Chem. Soc., 2001, 123, 7797-7803). Surface modification of $SiO_2$ with alcohol with synthesis thereof is also known (the same reference as above Kirk J. Ziegler, R. Christopher Doty, Keith P. Jonston, and Brian A. Korgel, "Synthesis of Organic Monolayer-Stabilized Copper Nanocrystals in Supercritical Water", J. Am. Chem. Soc., 2001, 123, 7797-7803).

The present inventors have proposed a nanoparticle synthesis in supercritical water for synthesizing highly crystalline particles of nano-size by adapting supercritical water as a reaction field for hydrothermal synthesis, but not referred to a process for modification of the surface of the produced particles or synthesis of organically modified particles by a reaction with an organic matter. There are frequently reported that high-temperature, high-pressure water forms a homogenous phase also with an organic material and that water functions as an acid or basic catalyst to progress an organic synthetic reaction even in no catalyst in a high-temperature, high-pressure field. However, the process for reaction between an inorganic material and an organic material has not been reported yet.

With respect to fine particles, particularly, nanoparticles, the usability of which is expected because of various useful properties and functions, a number of synthetic methods have been proposed and developed, including the supercritical synthetic method. However, a method for recovering the thus-synthesized fine particles or nanoparticles, and a method for dispersing and stabilizing the fine particles as they are without coagulation after recovery are needed. At the time of use, they must be satisfactorily dispersed in a resin, plastic or solvent. Particularly, nanoparticles synthesized in water are not easily recovered from water since they frequently have hydrophilic surfaces. The nanoparticles or the like have the problem of unfamiliarity with organic solvents, resins or the like.

In order to satisfy these needs, it might be necessary to modify the surface of nanoparticles with organic materials according to the respective purposes. For example, modification with the same polymer as the resin, or donation of the same functional group as the solvent is desirable. If the nanoparticles can be surface-modified in water, the separate recovery of the nanoparticles from water is facilitated. However, although it is desirable for the surface modification of nanoparticles synthesized in water with an organic material that the organic material forms a homogeneous phase with water, the modifying agent usable therefor is limited to an amphipathic surface active agent, a lower alcohol soluble even to water, and the like. Further, even if the nanoparticles are recovered by any method, the recovered nanoparticles are extremely easy to coagulate, and it is difficult to redisperse the nanoparticles coagulated once even by use of a dispersant. The surface modification of such nanoparticles is entirely difficult.

It is well-known that water and an organic material form a homogenous phase in a high-temperature, high-pressure field and, for example, alcohol and sugar, carboxylic acid and alcohol, or carboxylic acid and amine non-catalytically cause a dehydration reaction in high-temperature, high-pressure water. However, it is not known that a reaction is caused between hydroxyl group on the particle surface and the organic material in this condition.

Thus, it is needed to develop the method for introducing a required desirable functional group to nanoparticles at the time of synthesis thereof in water. As a result of the earnest studies, the present inventors found that synthesis of metal oxide particles in a high-temperature, high-pressure hydrothermal synthetic field in the coexistence of an organic material results in surface-modified fine particles having the organic material strongly bonded with the particle surface by the occurrence of a homogenous phase reaction between the particle surface and the organic material. It is also found that the resulting nanoparticles can be phase-separated from water with the remaining organic material, and easily recovered after cooling because they are organically modified. The present invention has been accomplished based on such knowledge.

SUMMARY OF THE INVENTION

The present invention provides the followings in typical aspects.

[1] Organically modified fine particles, including hydrocarbon strongly bonded with the surface of fine particles.

[2] The fine particles according to [1], wherein the hydrocarbon is strongly bonded with the surface of metal oxide fine particles, and the organically modified fine particles are organically modified metal oxide fine particles.

[3] The fine particles according to [1], wherein the average diameter of the fine particles is 100 nm or less.

[4] The fine particles according to [1], wherein the average diameter of the fine particles is 50 nm or less.

[5] The fine particles according to [1], wherein the average diameter of the fine particles is 20 nm or less.

[6] The fine particles according to [1], wherein the average diameter of the fine particles is 10 nm or less.

[7] The fine particles according to [1], wherein the average diameter of the fine particles is 5 nm or less.

[8] The fine particles according to any one of [1] to [7], wherein the hydrocarbon is a long-chain hydrocarbon having a chain having 1, 2, 3 or more carbon atoms.

[9] The fine particles according to any one of [1] to [8], wherein the strong bond is selected from the group consisting of ether bond, ester bond, bond through N atom, bond through S atom, metal-C— bond, metal-C= bond, and metal-(C=O)— bond.

[10] The fine particles according to any one of [1] to [9], wherein the covering ratio of the particle surface for the organic modification is adjusted.

[11] The fine particles according to any one of [1] to [10], wherein the hydrocarbon is strongly bonded with the surface of the fine particles with high-temperature, high-pressure water as a reaction field.

[12] The fine particles according to any one of [1] to [11], wherein the hydrocarbon is strongly bonded with the surface of the fine particles with water of a supercritical or subcritical condition as a reaction field.

[13] A process for producing organically modified metal oxide fine particles, comprising strongly bonding an organic material with the surface of metal oxide fine particles with high-temperature, high-pressure water as a reaction field, thereby synthesizing organically modified metal oxide fine particles.

[14] The process according to [13], wherein water of pressure and/or temperature conditions corresponding to or exceeding a critical point is adapted as the reaction field.

[15] The process according to [13] or [14], wherein the organically modified metal oxide fine particles are synthesized in a reaction field where water of conditions of temperature 250-500° C. and pressure 10-30 MPa is present.

[16] The process according to any one of [13] to [15], wherein the hydrocarbon is a long-chain hydrocarbon having a chain having 1, 2, 3 or more carbon atoms.

[17] The process according to any one of [13] to [16], wherein the strong bond is selected from the group consisting of ether bond, ester bond, bond through N atom, bond through S atom, metal-C— bond, metal-C= bond, and metal-(C=O)— bond.

[18] The process according to any one of [13] to [17], wherein an organic modifying agent is selected from the group consisting of alcohol, aldehyde, carboxylic acid, amine, thiol, amide, ketone, oxime, phosgene, enamine, amino acid, peptide, and sugar.

[19] The process according to any one of [13] to [18], wherein a solvent for promoting the phase homogenization of the organic modifying agent with water is used as a coexistent material.

[20] The process according to [19], wherein the solvent is selected from the group consisting of methanol, ethanol, propanol, i-propanol, butanol, i-butanol, t-butanol and ethylene glycol.

[21] The process according to any one of [13] to [18], wherein the reaction is carried out in the coexistence of an assistant for promoting the reaction.

[22] The process according to [21], wherein the reaction promoting assistant is an acid.

[23] The process according to [22], wherein the acid is selected from the group consisting of nitric acid, sulfuric acid, hydrochloric acid, bromic acid, formic acid, acetic acid, propionic acid and toluene sulfonic acid.

[24] The process according to any one of [13] to [23], wherein the reaction ratio of the organic modification is controlled by controlling a factor selected from the group consisting of the temperature, the acid concentration and the reaction time.

[25] A method for recovering or collecting fine particles, comprising organically modifying the surface of fine particles, thereby:

(1) precipitating and recovering metal oxide fine particles dispersed in an aqueous solution;

(2) transferring metal oxide fine particles dispersed in an aqueous solution to an organic solvent followed by recovering; or (3) collecting metal oxide fine particles in an oil phase-water phase interface.

[26] A process for producing fine particles, comprising producing metal oxide fine particles satisfactorily dispersed in an aqueous solution by organic surface modification including hydrophilic groups.

[27] A process for producing organically modified metal oxide fine particles, comprising producing metal oxide fine particles in the coexistence of an organic modifying agent in a reaction field for supercritical hydrothermal synthesis.

[28] The process according to [27], wherein the particle size of the generated particles is adjusted to a further small particle size.

[29] A process for producing organically modified metal oxide fine particles, comprising subjecting a metal compound to a hydrothermal reaction with high-temperature, high-pressure water as a reaction field to form metal oxide fine particles, and strongly bonding an organic matter to the surface of the formed metal oxide fine particles, thereby synthesizing organically modified metal oxide fine particles.

Fine particles with hydrophilic surface (particularly, nanoparticles) are surface-modified with the hydrophobic group of an organic matter such as hydrocarbon, whereby the particles which are difficult to be recovered from an aqueous medium can be easily and surely transferred to an organic medium and separated/recovered without impairing useful characteristics of the fine particles (particularly, nanoparticles). On the other hand, hydrophobic fine particles (particularly, nanoparticles) can be transferred to and separated/recovered from an aqueous medium side such as an aqueous solution by modifying the surface thereof with a hydrocarbon having hydrophilic group.

Since metal oxide fine particles (particularly, nanoparticles) present in an aqueous medium hardly form a homogeneous reaction system with a modifying agent having organic group such as hydrophobic hydrocarbon, the fine particles (particularly, nanoparticles) could not be organically modified without impairing the useful characteristics of the particles. However, this can be made possible by applying the modification of the present invention. Further, since the degree of modification can be controlled, various unique characteristics can be imparted, respectively, by the modification.

Other objects, features and superiority of the present invention and aspects thereof will be obvious for those skilled in the art from the following description. However, it should be understood that the accompanying specification including the following description and concrete examples describes preferred embodiments of the present invention and is disclosed only for illustration. It will be easily understood by those skilled in the art from the following description and the knowledge derived from other parts of the specification that various changes and/or alternations (or modifications) can be made without departing from the intention and scope of the present invention. All patent literatures and reference literatures cited herein are described for illustration, and the content thereof should be included herein as a part of the specification.

DESCRIPTION OF THE PREFERRED EMBODIMENTS

Figure 6:
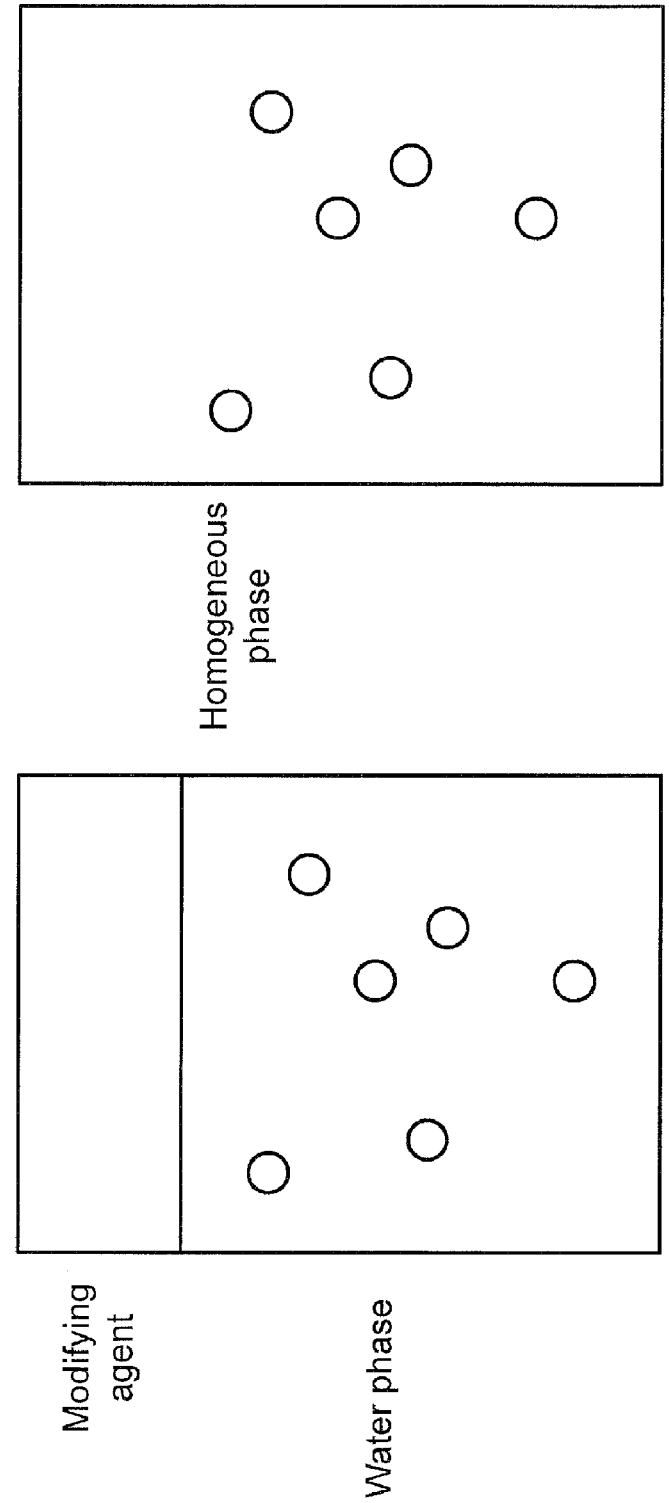
FIG. 6 schematically shows characteristics of the organic modification method according to the present invention.

The present invention provides a technique for bonding an organic matter with the surface of metal oxide fine particles with high-temperature, high-pressure water as a reaction field to synthesize organically modified metal oxide fine particles, particularly, organically modified metal oxide nanoparticles, which are attracting attentions in recent years because of their peculiar characteristics, the resulting organically modified metal oxide fine particles, and usage and applied technologies thereof. The present invention involves an organic modification method paying attention to the point that water and an organic material form a homogeneous phase in a reaction field showing a certain phase behavior. The features of this method are conceptually and schematically shown in FIG. 6.

Figure 1:
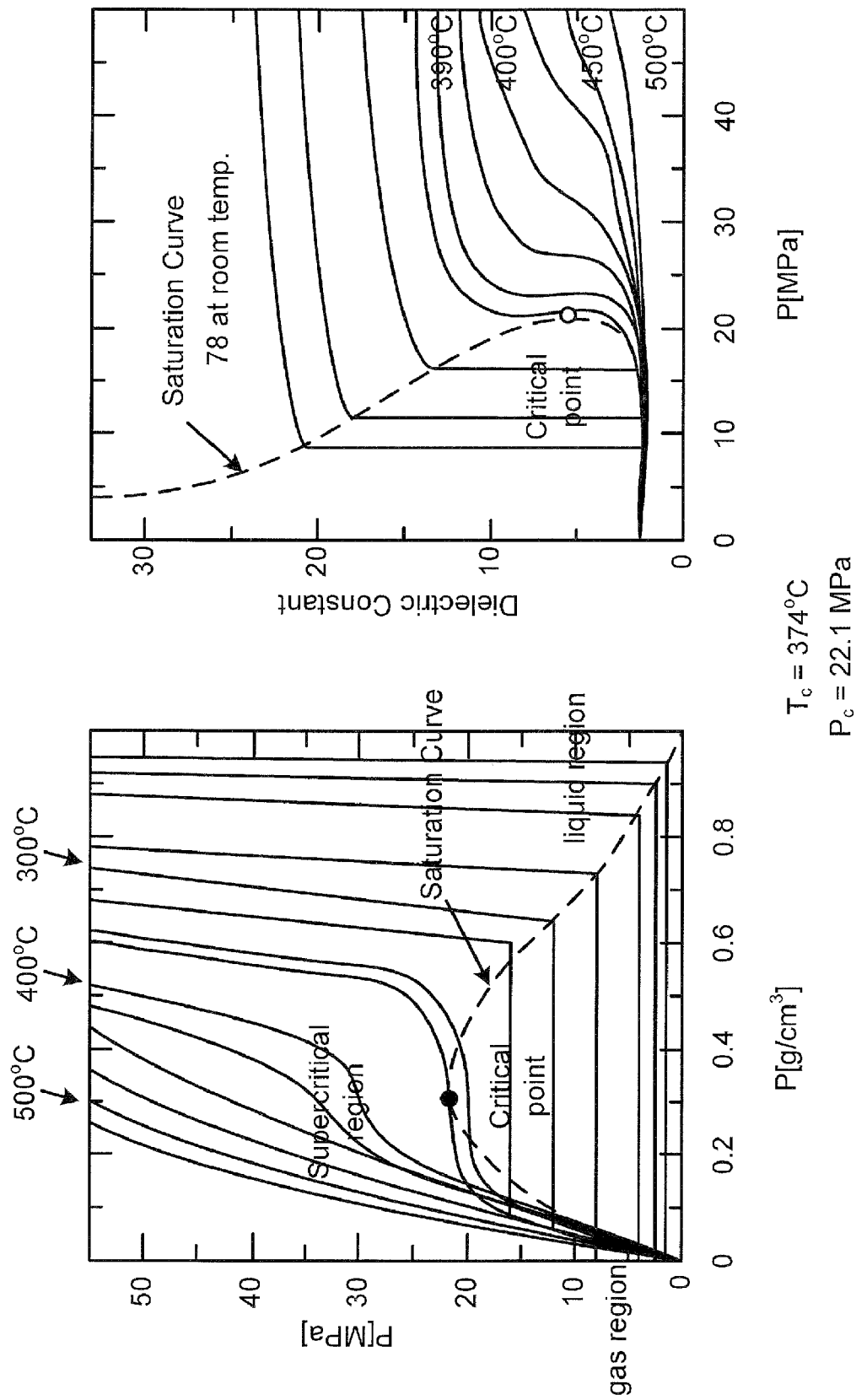
FIG. 1 shows the relation of density of water with pressure and temperature on the left and the relation of dielectric constant of water with pressure and temperature on the right.
Figure 2:
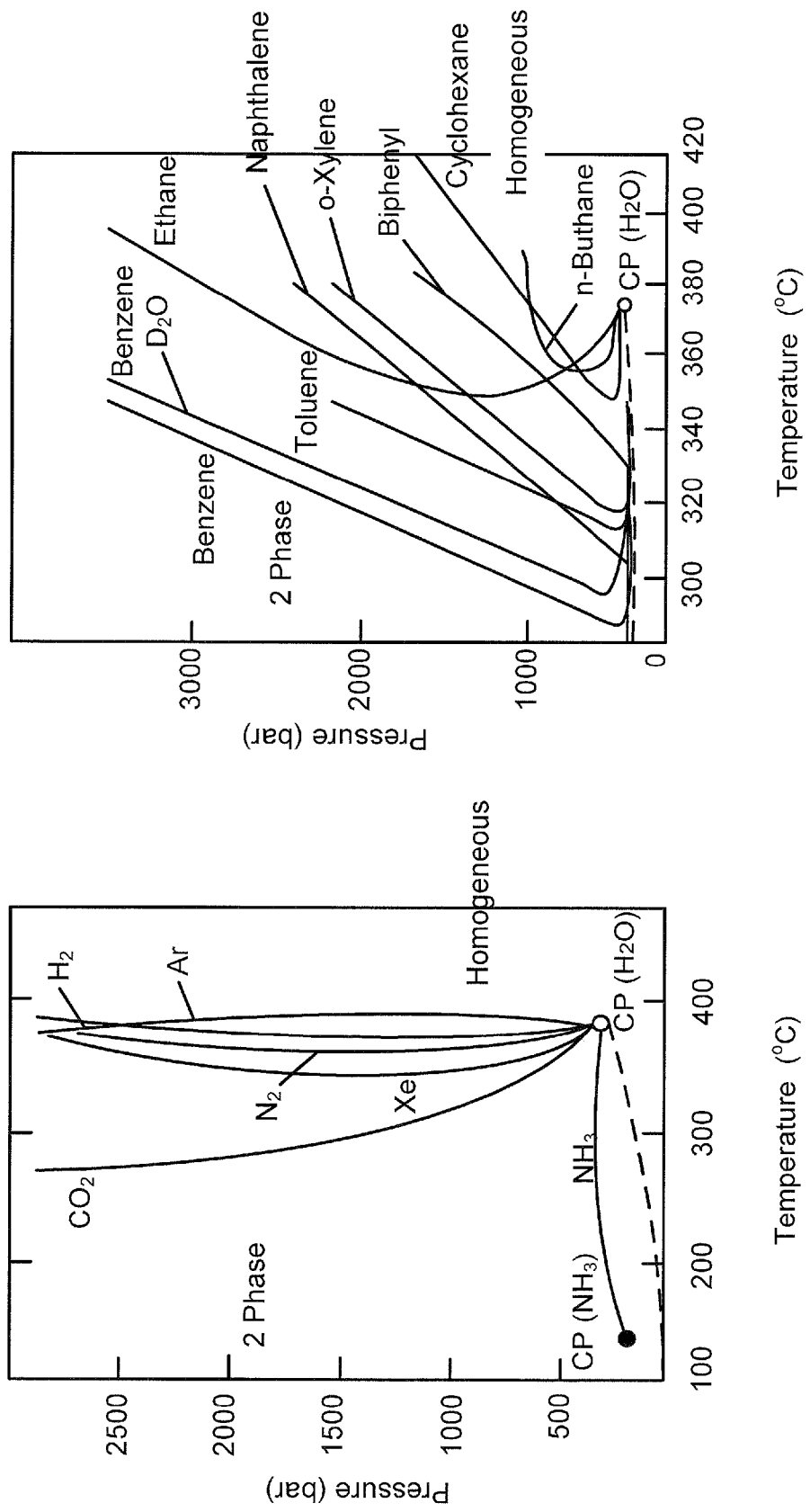
FIG. 2 shows the phase behavior of a water-gas binary system in the vicinity of a critical point of water (on the left), and the phase behavior of a water-organic solvent system therein (on the right)

As the reaction field of the modification reaction of the present invention, suitably, pressure and/or temperature conditions corresponding to or exceeding the subcritical or critical point of water are given. FIG. 1 shows the density of water-temperature/pressure dependency (on the left of FIG. 1) and the dielectric constant of water-pressure dependency (on the right of FIG. 1). As is apparent therefrom, when the region of temperature/pressure corresponding to or exceeding the critical point of water is adapted as the reaction field, a unique reaction environment can be provided. FIG. 2 shows the phase behavior of a water-gas binary system in the vicinity of the critical point of water (on the left of FIG. 2) and the phase behavior of a water-organic solvent system (on the right of FIG. 2), from which it is obvious that a characteristic homogenous phase forming region exists, and this is applicable to the modification reaction of the present invention.

At the time of using nanoparticles, by introducing a functional group having high affinity with a solvent or resin to be used for to the particles, the particles can be dispersed to the solvent or resin at high concentration.

In the present invention, the particle size can be also controlled by performing the in-situ surface modification in a reaction field for hydrothermal synthesis including a supercritical region.

The term "fine particles" referred to herein may indicate those with an average particle size of 1 μm (1,000 nm) or less and, preferably, nanoparticles. The nanoparticles may generally include those of an average particle size of 200 nm or less and, preferably, those of 200 nm or less. The nanoparticles can have an average particle size of 100 nm or less in a certain case, and an average particle size of 50 nm or less in another case. The nanoparticles further can have an average particle size of 20 nm or less in a suitable case, and an average particle size of 10 nm or less, or 5 nm or less in other cases. Although the particle size of nanoparticles is preferably uniformed, those different in particle size can be suitably mixed in a fixed ratio.

The particle size can be measured by a method known in the relevant field, for example, by TEM, adsorption method, light scattering method, SAXS or the like. In the TEM, at the time of electron microscopic observation, it must be carefully confirmed that particles within the field of view are representative for all the particles when the particle size distribution is wide. In the adsorption method, a BET surface area is evaluated by $N_2$ adsorption or the like.

Fine particles generated by means of hydrolysis reaction are generally composed of a hydroxide such as $Fe(OH)_3$, and the equilibrium is shifted to $FeO(OH)$ and $Fe_2O_3$ as the temperature is raised. The molecular arrangement state is shifted from a random amorphous state to a neatly arranged crystal state as the temperature is raised. Highly crystalline nanoparticles which are organically modified can be obtained by using the technique of the present invention.

The high crystallinity can be confirmed by electron diffraction method, analysis of electron microgram, X-ray diffraction, thermogravimetry or the like. In the electron diffraction, as a diffraction interference image, dots are obtained in case of monocrystal, rings in polycrystal, and halos in amorphous. In the electron microgram, a crystal plane is clearly observed in case of monocrystal, and polycrystal has a shape such that crystals further appear from above particles. When primary particles of polycrystal are small, and many particles are coagulated to form a secondary particle, a spherical shape is observed. The amorphous necessarily shows a spherical shape. In the X-ray diffraction, a sharp peak can be observed in case of monocrystal. The crystallite size can be evaluated from the width of ½ height of the X-ray peak by use of Sherre's expression. When the crystallite size obtained by this evaluation is equal to the particle size evaluated from the electron microscopic image, monocrystal is evaluated. In the thermogravimetry, when heating is performed in a dry inactive gas by a thermobalance, a reduction in weight by evaporation of adsorbed moisture is observed at about 100° C., and a reduction in weight by dehydration from the particles is observed up to about 250° C. If an organic material is contained, a further large reduction in weight is observed at 250-400° C. In case of the particles obtained by the technique of the present invention, even if the temperature is raised to 400° C., the reduction in weight by dehydration from the crystals is 10% or less at a maximum, greatly different from the case of metal oxide fine particles synthesized at low temperature. Accordingly, the fine particles of organically modified metal oxide fine particles obtained according to the present invention have high crystallinity as features; for example, they have sharp peaks in X-ray diffraction, dots or rings are observed in electron diffraction, dehydration of crystal water is 10% or less per dry particle in thermogravimetry, and/or the primary particle has a crystal plane in electron microgram.

When a separating or dispersing operation of fine particles is performed in relative to particle size by opposing the surface energy with an external energy such as gravity or electric field or by means of centrifugal force, gravity settling, electrophoresis, or the like, particles with a particle size of several 100 nm or less can be dispersed only when a large external field force is given thereto. With a particle size of 50 nm or less, the influence of the surface energy is further increased, and the dispersion is extremely difficult only with the external field energy, unless the surface property, the physical property of the solvent, or the like is controlled. The technique of the present invention can solve this problem.

Particularly, when the particle size is 10 nm or less, the overlapping in a quantum state is eliminated, and the electron state on the surface seriously affects the bulk physical properties. Therefore, physical properties completely different from those of bulk particles can be obtained, or a quantum size effect (Kubo's effect) is exhibited. Although the particles of a size of about 10 nm or less can be regarded particularly as completely different materials, such fine nanoparticles can be suitably organically modified according to the technique of the present invention.

Typical fine particles in the present invention include those essentially composed of a metal oxide, and these will be hereinafter referred to as "metal oxide fine particles".

As the "metal" in a metal oxide contained in the metal oxide fine particles, typically, any metal capable of producing nanoparticles can be selected and used, without particular limitation, from metals known by those skilled in the art. Examples of typical metals include, with the line connecting boron (B) of the group IIIB, silicon (Si) of the group IVB, arsenic (As) of the group VB, and tellurium (Te) of the group VIB in the long-period periodic table as a border, elements located on this line and elements situated on the left side or the lower side of the border in the long-period periodic table, including Fe, Co, Ni, Ru, Rh, Pd, Os, Ir, Pt, etc. as elements of the VIII group; Cu, Ag, Au, etc. as elements of the group IB; Zn, Cd, Hg, etc. as elements of the group IIB; B, Al, Ga, In, Tl, etc. as elements of the group IIIB; Si, Ge, Sn, Pb, etc. as elements of the group IVB; As, Sb, Bi, etc. as elements of the group VB; Te, Po, etc. as elements of the group VIB; and elements of the groups IA-VIIA. Examples of the metal oxide include oxides of Fe, Co, Ni, Cu, Ag, Au, Zn, Cd, Hg, Al, Ga, In, Tl, Si, Ge, Sn, Pb, Ti, Zr, Mn, Eu, Y, Nb, Ce, Ba, etc., and concrete examples thereof include $SiO_2$, $TiO_2$, $ZnO_2$, $SnO_2$, $Al_2O_3$, $MnO_2$, NiO, $Eu_2O_3$, $Y_2O_3$, $Nb_2O_3$, InO, ZnO, $Fe_2O_3$, $Fe_3O_4$, $CO_3O_4$, $ZrO_2$, $CeO_2$, $BaO.6Fe_2O_3$, $Al_5(Y+Tb)_3O_{12}$, $BaTiO_3$, $LiCoO_2$, $LiMn_2O_4$, $K_2O.6TiO_2$, AlOOH, and the like.

Figure 3:
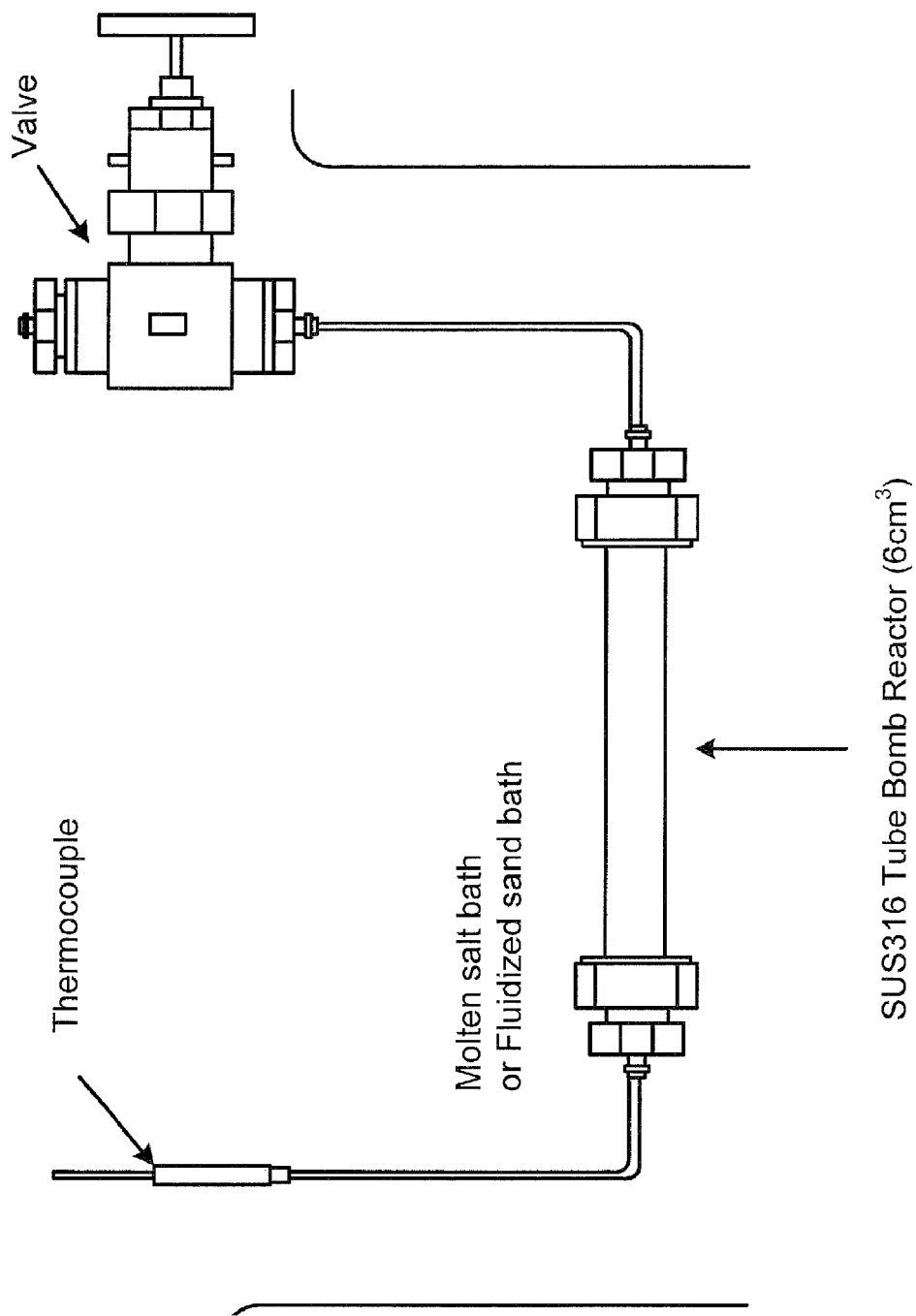
FIG. 3 shows a typical reactor used for organic modification according to the present invention.
Figure 5:
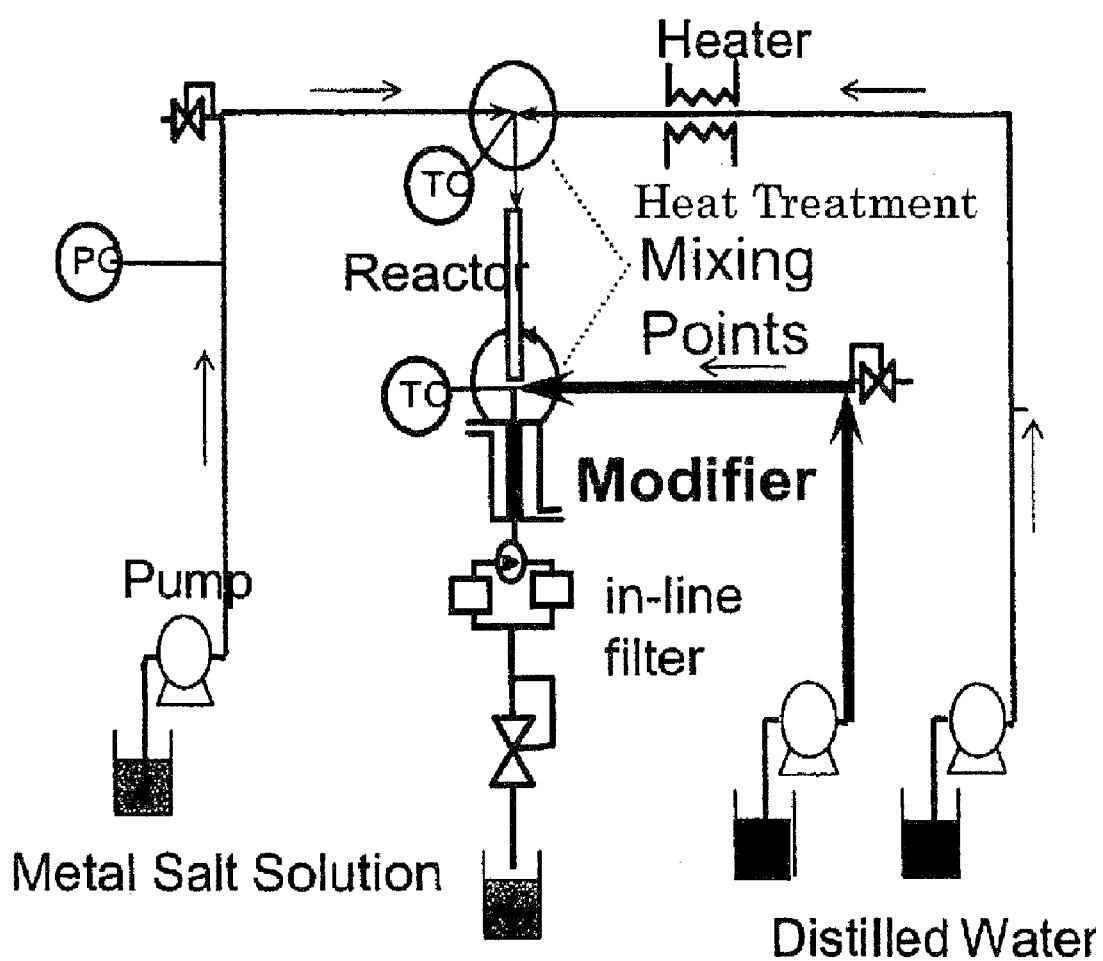
FIG. 5 shows a typical reaction system apparatus used for the organic modification according to the present invention.

In the organic modification of the surface of fine particles, particularly, nanoparticles, any device capable of attaining a high-temperature, high-pressure condition can be selected and used, without particular limitation, from devices well-known by those skilled in the art in the relevant field. For example, both a batch device and a distribution type device are applicable. A typical reactor is shown in FIG. 3 as an example, which may a system as shown in FIG. 5. A proper reaction device can be constituted as occasion demands.

As the organic modifying agent, those capable of strongly bonding hydrocarbon with the surface of fine particles can be selected, without particular limitation, from organic materials well-known in the fields where the application of nanoparticles is expected, including the fields of organic chemistry, inorganic material, and polymer chemistry. As the organic modifying agent, for example, those permitting formation of a strong bond such as ether bond, ester bond, bond through N atom, bond through S atom, metal-C— bond, metal-C= bond, metal-(C=O)— bond or the like are given. As the hydrocarbon, those having 1 or 2 carbon atoms can be used without particularly limiting the carbon number. From the point of effectively using the features of the present invention, a long-chain hydrocarbon having a chain having 3 or more carbon atoms is preferably used, and examples thereof include straight-chain, branched-chain or cyclic hydrocarbons having 3-20 carbon atoms. The hydrocarbons may be substituted or non-substituted. The substituent may be selected from functional groups well-known in the fields of organic chemistry, inorganic material, polymer chemistry and the like, and one or more substituents can exist in the hydrocarbon, wherein the substituents may be the same or different.

Examples of the organic modifying agent include alcohols, aldehydes, ketones, carboxylic acids, esters, amines, thiols, amides, oximes, phosgenes, enamines, amino acids, peptides, sugars and the like.

Typical modifying agents include pentanol, pentanal, pentanoic acid, pentane amide, pentathiol, hexanol, hexanal, hexanoic acid, hexane amide, hexane thiol, heptanol, heptanal, heptanoic acid, heptane amide, heptane thiol, octanol, octanal, octanoic acid, octane amide, octane thiol, decanol, decanal, decanic acid, decane amide, decane thiol, and the like.

Examples of the hydrocarbon group include a straight-chain or branched-chain alkyl group which may be substituted, a cyclic alkyl group which may be substituted, an aryl group which may be substituted, an aralkyl group which may be substituted, a saturated or unsaturated heterocyclic group which may be substituted, and the like. Examples of the substituent include carboxyl group, cyano group, nitro group, halogen, ester group, amide group, ketone group, formyl group, ether group, hydroxyl group, amino group, sulfonyl group, —O—, —NH—, —S— and the like.

Reaction Mechanism

A hydroxyl group is generally present on the surface of a metal oxide in water. This is resulted from the following equilibrium in reaction.

$$MO+H_2O=M(OH) \quad (1)$$

This reaction is generally endothermic, and the equilibrium is shifted to the left at a high temperature side. The reaction by the surface modifying agent used is as follows, and it is caused by dehydration reaction.

The left-pointing reaction (reverse reaction) is a reaction well-known as hydrolysis of alkoxide or the like, which is easily caused by addition of water even at about room temperature. This reverse reaction is generally inhibited at high temperature side because it is an endothermic reaction, and the right-pointing reaction becomes more advantageous. This is the same as the temperature dependency of the dehydration reaction of metal hydroxide of equation (1).

The product in water is stabilized more advantageously as the polarity of the solvent is lower, since the polarity of the product is low in the right-pointing reaction (dehydration), compared with in the reaction original system. The higher the temperature is, the lower the dielectric constant of water is. The dielectric constant is reduced to 15 or less at 350° C. or less and suddenly reduced to about 1-10, particularly, in the vicinity of the critical point. Therefore, the dehydration reaction is accelerated beyond a general temperature effect.

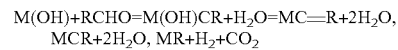

(these equations are referred to as (2))

Figure 7:
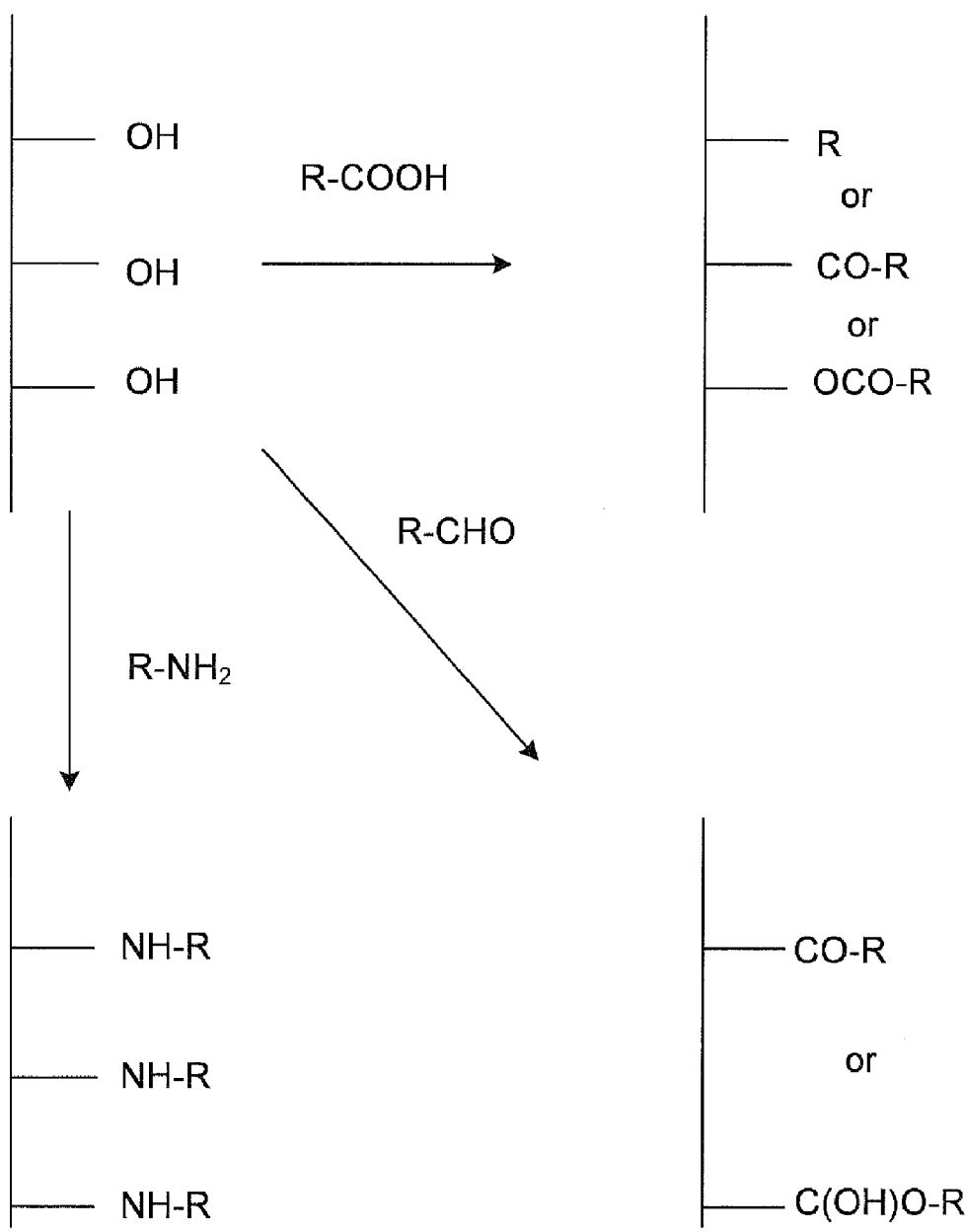
FIG. 7 schematically shows the mechanism of the modification reaction according to the present invention.

Although it is known that the attack on hydroxyl group by amine progresses in the coexistence of a strong acid or through a substitution by Cl at room temperature, its replacement with OH occurs in high-temperature, high-pressure water. It is confirmed, with respect to organic materials, that amination of hexanol progresses with carboxylic acid as a catalyst between hexane amide and hexanol, and it can be presumed that a similar reaction is proceeding. A part of the reaction mechanism of this technique is schematically shown in FIG. 7 as an example.

In case of thiol, the probability of reduction in the reaction field is reported and it can be presumed that the thiol was partially reduced on the metal oxide surface, causing a thiol additive reaction thereby.

Setting Method of Conditions

1) Equilibrium in Reaction

The reaction condition causing the organic modification can be summarized as followed although it is varied depending on the kind of metals and the modifying agent.

When the equilibrium of equation (1) is on the right and the equilibrium of equation (2) is on the right, the reaction progresses. Since the respective equilibriums are varied depending on the kind of metals and modifying agent, the optimum reaction condition therefor is also varied. When the temperature is raised, the equilibrium of equation (2) is shifted to the right and suddenly shifted to the progress side, particularly, at 350° C. or higher, while the equilibrium of equation (1) is shifted to the left. For the reaction conditions, DB of equations (1) and (2) are referred to.

Since the functional group on the surface of the metal oxide can be made to OH by coexistence of a base or acid, the dehydration reaction with the modifying agent can be progressed in this condition. In that case, since the dehydration reaction is apt to occur in the presence of the acid, the reaction can be progressed by slight coexistence of the acid at high temperature.

2) Phase Equilibrium

Since alcohols, aldehydes, carboxylic acids and amines which are relatively short-chain hydrocarbons are soluble to water, for example, surface modification of the metal oxide with methanol is possible. However, in case of long-chain hydrocarbons, since phase separation from water phase is caused, the metal oxide actually located in water phase may not react with the organic modifying agent even if the equilibrium in reaction gets closer to the progress side. Namely, introduction of lipophilic group is relatively easy, but the phase behavior must be taken into consideration when a long-chain hydrocarbon having three or more carbon atoms is intended.

The phase behavior of hydrocarbon and water is already reported, and this can be referred to. In general, since they form a homogeneous phase in an optional ratio with a vapor-liquid critical locus or more, such temperature/pressure conditions are set, whereby a satisfactory reaction condition can be set.

When a further lower optimum reaction temperature is desired, a third component can be made to coexist to form a homogeneous phase of water and the organic matter. For example, it is known that the coexistent region of hexanol and water can be formed at a further low temperature by the coexistence of ethanol or ethylene glycol which forms a homogeneous phase with water even at low temperature. This can be applied to the reaction of a metal oxide and an organic material. In this case, it is important to select the third component so as not to cause a surface modification reaction by the third component.

The long-chain organic modification in water can be performed only by the above-mentioned technique.

In-Situ Surface Modification in Hydrothermal Synthesis

As described above, the generation of hydroxyl group on the metal oxide surface of equation (1) and the temperature dependency of organic modification reaction of equation (2) are reversed. Therefore, when the reaction of equation (1) is on the left or on the dehydration side, in order to cause a surface modification reaction, the setting of the reaction condition such as coexistence of an acid becomes extremely important, but might be difficult.

The in-situ surface modification in hydrothermal synthesis enables this.

The hydrothermal synthesis progresses by the following reaction route.

$Al(NO_3)_3 + 3H_2O = Al(OH)_3 + 3HNO_3$

$nAl(OH)_3 = nAlO(OH) + nH_2O$

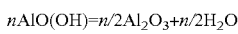

$nAlO(OH) = n/2 Al_2O_3 + n/2 H_2O$

Figure 18:
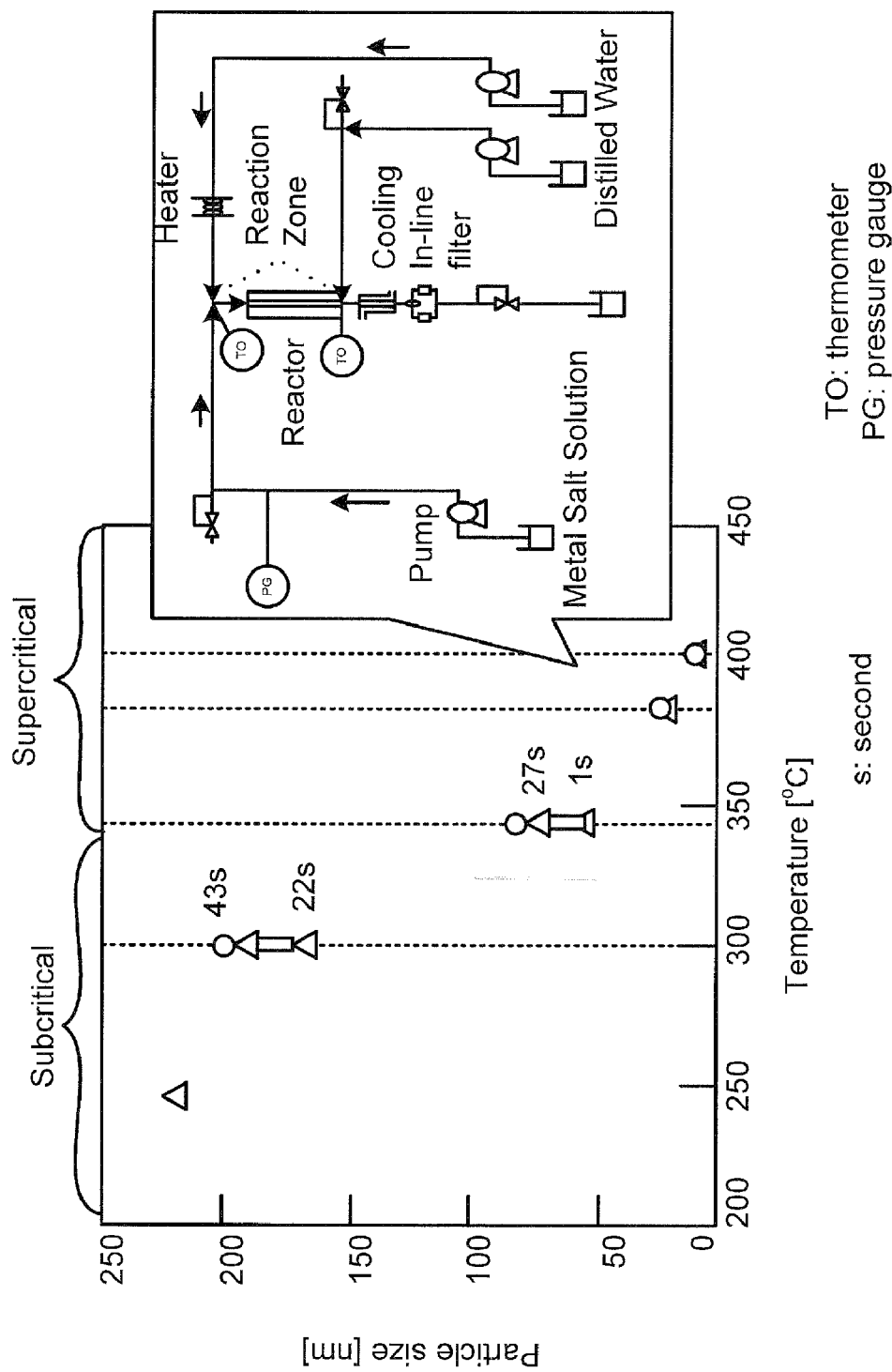
FIG. 18 shows the relation between a typical device configuration and particle size obtained in each condition in the synthesis of fine particles by executing a hydrothermal synthesis with high-temperature, high-pressure water such as subcritical or supercritical water as a reaction field.

In use of other metal spices and sulfates, hydrochlorides or the like, the synthesis progresses also by such a route. When the hydrothermal synthesis is carried out, for example, by use of a device as shown in FIG. 18 with high-temperature, high-pressure water as a reaction field, particles of a further minute particle size can be obtained as shown in FIG. 18. Therefore, it will be obvious that further fine organically modified particles can be obtained according to the in-situ surface modification technique. It will be also obvious that the size of particles can be controlled by adjusting the temperature or pressure.

As shown herein, even if the hydroxyl group is finally desorbed from the surface by the dehydration reaction, many hydroxyl groups are generated in a product or on the surface thereof as a reaction precursor. If the organic modifying agent is coexistent in this reaction field, the reaction can be carried out in a condition where the hydroxyl groups are present. Since the acid also as a catalyst for proceeding the dehydration reaction is coexistent in the reaction field, the modification reaction is accelerated. Accordingly, the surface modification which could not be performed to oxides can be carried out.

According to the technique of the present invention, the surface of fine particles can be organically modified without being based on that the equilibration to an oxide by attainment of a high-temperature field, such that a precursor is once synthesized and then subjected to hydrolysis or the like to synthesize a metal oxide or metal hydroxide, or without using a surface radical polymerizing substrate, for example, an oxidizing material sensitive to temperature or light. Accordingly, metal particles or particles with different oxidation-reduction states can be organically surface-modified.

In the present invention, synthesis of an inorganic-organic composite material is attempted by use of a phase state such that water and an organic material forms a homogeneous phase, in which the surface of highly crystalline metal or metal oxide nanoparticles of a size of several nm to 50 nm or less is modified with an organic molecule while synthesizing them. By using the high-temperature, high-pressure water hydrothermal synthetic method therein, the conventional problems of 1) organically modifying the surface of highly crystalline nanoparticles while synthesizing it and 2) forming a polymer film of single layer can be solved. Further, the conventional industrial problems of 1) recovery of nanoparticles from a reaction solvent; 2) stable dispersion and retention thereof over a long period at high concentration in the solvent; 3) homogenous dispersion thereof with a polymer in high concentration; and 4) two-dimensional arrangement of nanoparticles can be solved thereby.

Various nanoparticle synthetic methods such as CVD, PVD, atomization thermal decomposition, sol-gel process, reversed micelle method, hot soap method, and supercritical hydrothermal synthesis have been developed. However, because nanoparticles are easily coagulated with extremely high surface energy, natural physical properties thereof cannot be often exhibited. A method for recovering the nanoparticles is needed. Further, the nanoparticles must be dispersed and stabilized after recovery. The nanoparticles must be satisfactorily dispersed to a resin, plastic or solvent at the time of use. To satisfy these needs, it is necessary to modify the surface of the nanoparticles with organic materials according to the respective purposes. It is desirable to modify the same polymer as the resin and the same functional group as the solvent. These can be solved by the present invention.

Some techniques for surface-modifying the nanoparticles are proposed. However, with a conventional weak linkage such as coordination of thiol with a metal surface or adsorption of a surface active agent to a metal oxide, semiconductor characteristic, fluorescent characteristic, light emitting characteristic, dielectric characteristic and the like, which are developed by making particles to a nano-size, might be lost. If a metal or metal oxide can be covalent-bonded with an organic molecule, nonconventional characteristics of nanoparticles can be derived. In $BaTiO_3$, for example, although a dielectric loss appears in an adsorption layer, it can be significantly reduced in a covalent-bond molecule.

The technique for performing the organic modification by forming the covalent bond includes use of a silane coupling agent. In this case, formation of a Si atom layer on the nanoparticle surface might cause a loss of semiconductor characteristic, fluorescent characteristic, light emitting characteristic, dielectric characteristic and the like of the nanoparticles similarly to the above. Introduction of a functional group by use of a chloro-compound is also included. This might cause dissolution of nanoparticles in the modification reaction condition (in a high pH or a low pH). These problems can be solved by the present invention. According to the present invention, a high-temperature, high-pressure hydrothermal synthetic method can be adapted, and highly crystal nanoparticles can be organically modified with synthesis thereof. When an organic material is made coexist in a high-temperature, high-pressure hydrothermal synthetic field, a strong surface modification having the organic material bonded with the surface of metal oxide particles is formed by the homogeneous phase reaction of the organic material with the particle surface, while synthesizing the particles. Even particles of a particle size of 50 nm or less can be sufficiently provided while keeping extremely high crystallinity. The high-temperature, high-pressure water forms a homogenous phase even with the organic material. An organic-inorganic combination is formed on the generated particle surface. Since other reactions such as polymerization reaction are never caused, modification of only one layer can be performed. The surface modification inhibits the crystal growth to enable synthesis of nanoparticles. At the time of synthesis, an in-situ high-temperature thermal treatment effect can be obtained to enhance the crystallinity.

In the present invention, use of an organic/inorganic composite body as a precursor is not requested as a means for synthesizing nanoparticles, and the applicable range thereof is remarkably excellent.

Consequently, the following effects can be expected.

1) Recovery of Nanoparticles from Water Phase.

The nanoparticles synthesized in supercritical water are generally suspended in water. However, they can be transferred to oil phase by the surface modification of the present invention, and perfectly separated from water.

The recovery of the nanoparticles was extremely difficult. Although addition of a coagulating agent or use of a surface active agent or adsorbent is empirically adapted, a technique for further recovering the nanoparticles therefrom is needed, and a new dispersing technique is also requested to disperse them. According to the technique of the present invention, the particles can be recovered as they are without requiring such an operation.

2) Satisfactory Dispersion of Nanoparticles in an Organic Solvent, Super-High Concentration Dispersion Possible in Principle Hydrophilic titania particles were suspended in water, but transferred from water to chloroform phase by the surface modification of the present invention.

The surface modification can be performed while performing crystal precipitation without surface modifying operation, a surface reforming operation with a surface active agent or the like as in the past. Although the conventional methods had a limitation for introduction of a modifying group, an optional modifying group can be introduced. Accordingly, a solvent most suitable to a resin or solvent can be selected. The same molecule as the resin or solvent is used, whereby ultimately high-concentration dispersion and even dispersion without using the solvent or resin can be performed.

3) Interface Arrangement by Surface Modification with Controlled Covering Ratio

It was observed that, when the covering ratio is reduced by controlling the reaction, particles are arranged in the interface of water and oil. Accordingly, in addition to the recovery of particles, a nanoparticle arrangement can be performed by using the technique of the present invention.

4) Continuous Control of Dispersibility

Figure 19:
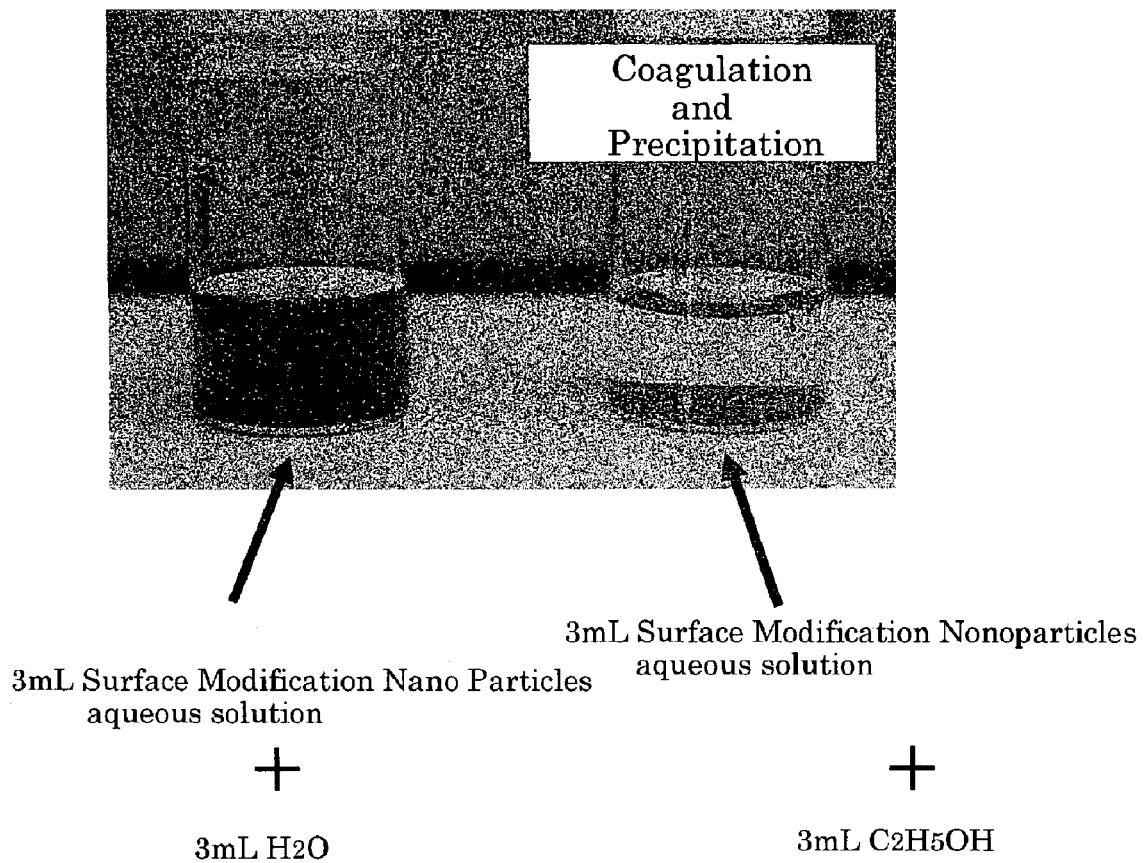
FIG. 19 shows that metal oxide fine particles organically modified by the technique of the present invention exhibits a property such as a unique dispersibility to medium by adjusting its affinity with a solvent.

The nanoparticles dispersed in water can be easily precipitated by use of a proper solvent system such as a solution of water:ethanol=50:50 by surface-modifying them according to the technique of the present invention. The concentration at which the precipitation starts can be continuously changed by controlling the degree of surface modification. Concretely, for example, a phenomenon as shown in FIG. 19 can be attained.

5) Presentation of Selective Recognition Ability

Nanoparticles modified with a functional group forming no chemical bond therewith or nanoparticles modified with a functional group forming a chemical bond therewith can be produced. The mutually bonding ability can be given by such a surface modification, and a high-order structure of nanoparticles can be formed by use of the technique of the present invention.

The nanoparticles are applied to various uses; for example, $SiO_2$ for a pigment, a catalyst carrier, a high-temperature material, a honeycomb, an anticorrosive material, etc.; $Fe_2O_3$ for a pigment, a magnetic material, etc.; $CeO_2$ for an abrasive material, a catalyst carrier, an ion conductor, a solid electrolyte, etc.; $TiO_2$ for a photocatalyst, a cosmetic, etc.; $Y_2O_3$ for a pigment, a catalyst carrier, etc.; InO for a transparent conductor, etc.; ZnO for a phosphor material, a conductive material, a pigment, a electronic material, etc.; $SiO_2$ for a catalyst carrier, a zeolite, a filler, a bead, etc.; $SnO_2$ for a conductive material, a conductor, a sensor, a honeycomb, etc.; $Nb_2O_3$ for a magnetic material, etc.; Cu, Ag or Al for an electrode, a catalyst material, etc.; Ni for an electrode, a magnetic material, a catalyst material, etc.; Co or Fe for a magnetic material, a catalyst material, etc.; Ag/Cu for an electrode, a catalyst material, etc.; and $B_4C$, $TiB_2$ and the like for a high-temperature material, a high-strength material, etc.

Figure 4:
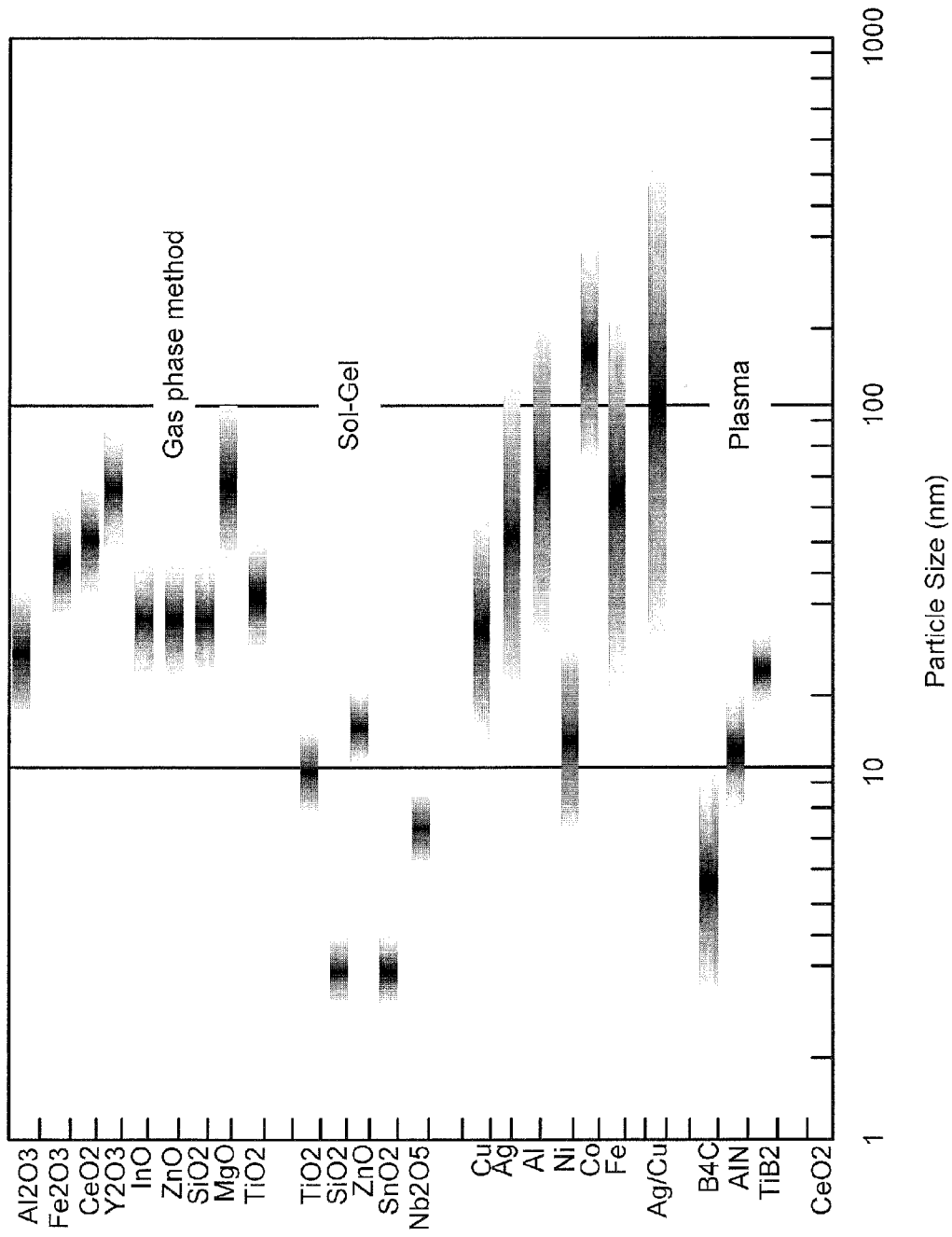
FIG. 4 shows typical nanoparticles the use of which is desired with typical production process and particle sizes thereof.

The nanoparticles or a thin film having a specified arrangement of the nanoparticles are recognized to show unique excellent characteristics, respectively. For example, it is known that nanoparticles arranged in a single layer, or magnetic nanoparticles show excellent functions as a near-field storage medium, in which the nanoparticles can be compactly filled. They effectively exhibit excellent characteristics in application to a magnetic tape or the like. Since a quantum size effect can be obtained in nanoparticles arranged in a dispersion system pattern, for example, a nanophosphor, a product such as quantum effect phosphor, quantum effect light emitter, or LSI high-density mounting base can be provided. A multilayer simultaneous arrangement of nanoparticles such as titania shows excellent functions such as low light scattering and photocatalyst effect, and is made into a wet photoelectric conversion element, a high-function photocatalyst coating or the like. A particle-dispersed film shows excellent functions such as a reinforcing effect or an inflammable effect, and is made into a semiconductor sealant or the like. Typical nanoparticles and fine particles and the preparation methods and particle sizes thereof will be understood in reference to FIG. 4.

Fine particles (including nanoparticles) organically surface-modified according to the present invention function as particles suitable to users' needs. For example, the particles are useful as a high-concentration barium titanate-dispersed resin for semiconductor packaging, nanoparticle-dispersed ink for ink jet, a battery material, a catalyst material, a lubricant or the like, and such a material can be prepared as follows.

An electronic part such as a semiconductor is needed to be packaged with a high-dielectric constant resin in order to eliminate electric disturbance out of the package. A barium titanate particle-dispersed thermosetting resin is used therefor. A high-concentration barium titanate-dispersed resin for packaging a semiconductor requires high concentration dispersion of barium titanate particles. Although the barium titanate can be dispersed in a resin using a surface active agent, it has the problem of causing a dielectric loss in the interface. By using the technique for producing organic modified fine particles of the present invention, surface-modified particles with strong linkage can be synthesized, and by introducing the same monomer as the resin, a material in which the resin is integrated with the organic material can be ultimately synthesized.

The nanoparticles are used for ink for high-tech equipment, for example, nanoparticle-dispersed ink for ink jet because of excellent physical properties such as hue, satisfactory coloring and durability. An ink jet printer by the ink dispersed with nanoparticles is expected to be used for formation of wiring and circuit diagrams by ink jet. However, to that end, it is necessary to synthesize nanoparticles suitable thereto and disperse them to a solvent in a high concentration. According to the technique for producing organically modified fine particles of the present invention, particles having the same polymer as an ink solvent can be synthesized.

A battery material, for example, an electrode material such as an Li ion battery or a capacitor material, is mixed with a carbonaceous material and made to a material for product. The battery material is needed to be sufficiently dispersed to carbon and a solvent. In general, a treatment using a dispersant is needed. According to the technique for producing organically modified fine particles of the present invention, a material homogenously dispersible with the solvent can be synthesized without using the dispersant.

A carrier metal catalyst is activated by a charge transfer caused by the interaction of the orbital function of the metal with an oxide catalyst. By using the technique for producing organically modified fine particles of the present invention, capable of mixing dissimilar materials in a nanometer order, a catalyst having activating points where the metal makes contact with the oxide in a high density can be prepared to produce an excellent catalyst material.

A lubricant, which is used to reduce the friction acting between solid bodies, can be expected to work as a nano-bearing by including the nanoparticles therein. Concretely, shearing force is converted to the rotating motion energy of the bearing, whereby the transmission to the other side of the shearing force is prevented. Conventionally, an organic polymer has been used as the lubricant, and oxide nanoparticles having a strong structure can be dispersed thereto by the technique for producing organically modified fine particles of the present invention.

The present invention will be further concretely described with working examples. The examples are provided simply to be illustrative of the present invention and informative for concrete embodiments thereof. These examples describe specified concrete embodiments of the present invention, but never limit the scope of the invention disclosed in the present application or indicate a limitation thereof. It should be understood that various embodiments can be made based on the idea herein.

All the examples were executed or can be executed by use of standard techniques, except those described in detail, and they are well-known and regular for those skilled in the art.

Example 1

Organic Modification of Metal Oxide Fine Particles in High-Temperature, High-Pressure Water)

Figure 8:
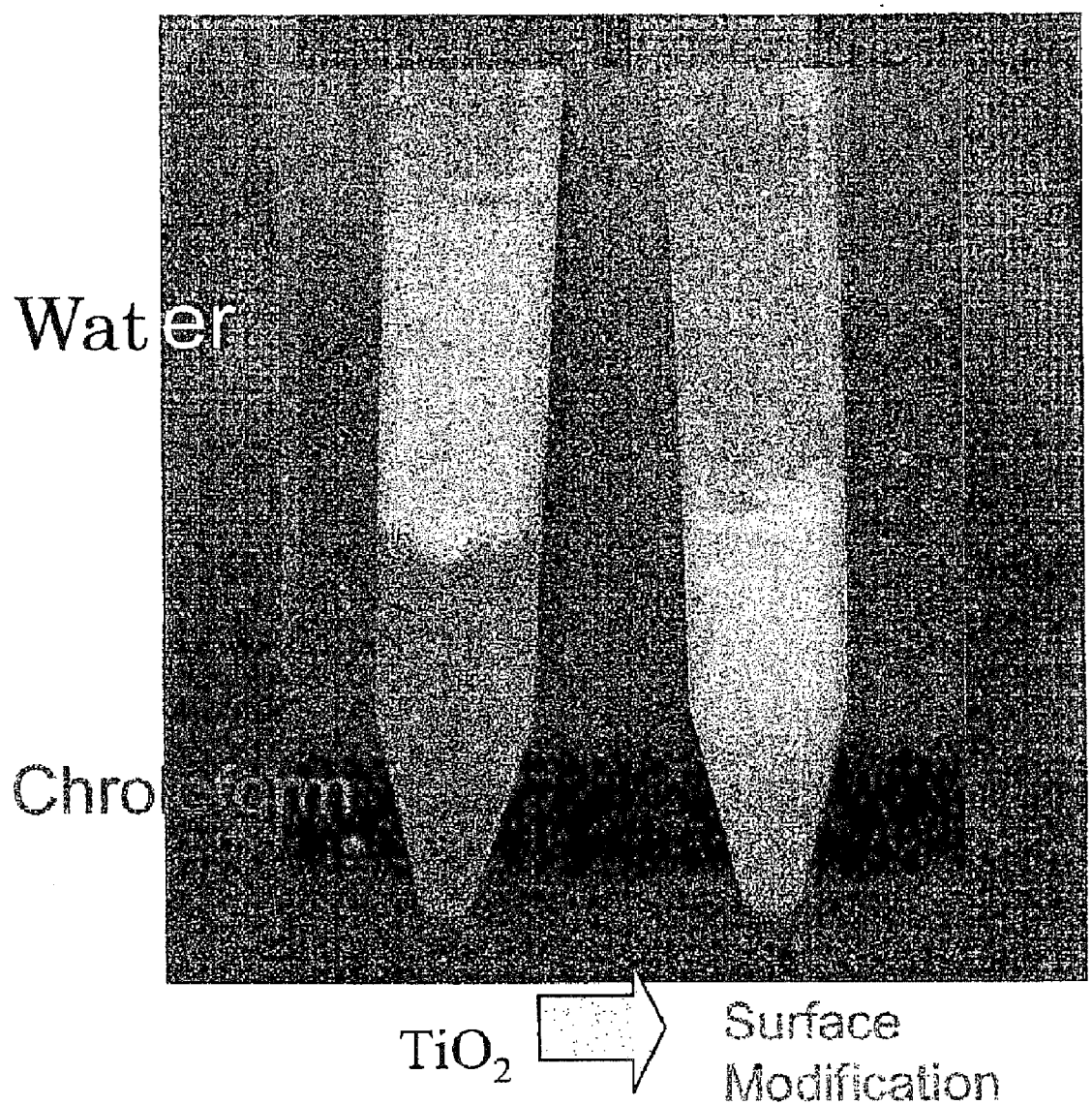
FIG. 8 shows metal oxide fine particles ($TiO_2$ nanoparticles) surface-modified with hexanal by the technique of the present invention (on the right), comparatively with non-modified particles (on the left)

An experiment was carried out using a 5 cc-tubular autoclave (tube bomb reactor). $TiO_2$ nanoparticles 0.1 g was charged in a reactor tube with pure water 2.5 cc and hexanal 0.1 cc. The reactor tube was put in a heating furnace preliminarily set to 400° C., and heated. The pressure is 390 bar on the assumption of pure water. It took 1.5 min to raise the temperature. The reaction was carried out for 10 min. The reaction was stopped by putting the reactor tube to cold water. The product was recovered by repeating washing with water and washing with chloroform twice. The recovered product is shown on the right of FIG. 8. In case of using no hexanal, the recovered product is in a state suspended in water as shown in the left of FIG. 8. This is caused by generation of hydrophilic groups. Such a remarkable difference cannot be observed only by mixing a modifying agent without reaction, showing that this is not resulted from physical adsorption of a modifying group. According to the IR spectral measurement of the resulting particles, the hydroxyl groups on the surface are reduced, linkages of Ti—O—R, Ti—(C=O)—R, and Ti—R were observed. The formation of covalent bond by the reaction could be confirmed.

Accordingly, surface modification of a metal oxide can be performed by using high-temperature, high-pressure water as a reaction solvent.

Example 2

Figure 9:
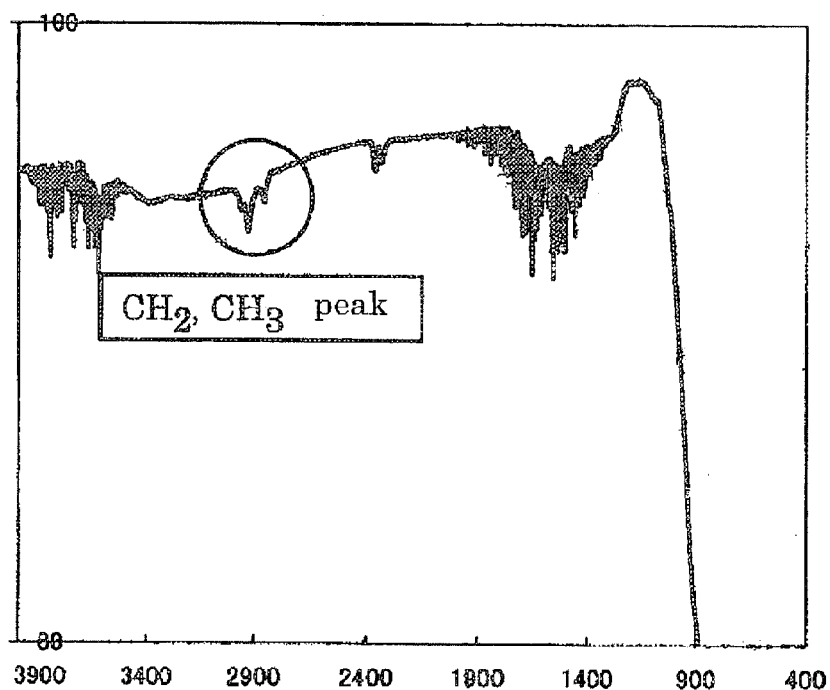
FIG. 9 shows an IR spectrum of the modified particles resulted from surface modification of metal oxide fine particles ($SiO_2$ nanoparticles) with hexylamine by the technique of the present invention.

Organic Modification of Metal Oxide Fine Particles in High-Temperature, High-Pressure Water An experiment was carried out using a 5-cc tubular autoclave (tube bomb reactor) similarly to Example 1. $SiO_2$ nanoparticles 0.1 g was charged in a reactor tube with pure water 2.5 cc and hexylamine 0.1 cc. The reactor tube was put in a heating furnace preliminarily set to 400° C., and heated. The pressure is 390 bar on the assumption of pure water. It took 1.5 min to raise the temperature. The reaction was carried out for 10 min. The reaction was stopped by putting the reactor tube to cold water. The product was recovered by repeating washing with water and washing with chloroform twice. In case of using no hexylamine, the recovered product is in a state suspended in water similarly to Example 1. This is caused by generation of hydrophilic groups. In contrast, when the modification was performed, the particles were collected to the interface between chloroform and water. It was found therefrom that the modification is too imperfect to provide a sufficient wetting angle to water and chloroform, the particles are not transferred to the chloroform phase but collected to the interface. A controlled organic modification in high-temperature, high-pressure water shows the probability of collection of a metal oxide to the interface. In this case, also, such a remarkable difference cannot be observed only by mixing a modifying agent without reaction, showing that this is not resulted from physical adsorption of a modifying group. According to the IR spectral measurement of the resulting particles, peaks of $CH_2$ and $CH_3$ were observed on the surface (FIG. 9). Accordingly, the formation of covalent bond by the reaction could be confirmed.

Example 3

Amino Acid Modification of Metal Oxide Fine Particles in High-Temperature, High-Pressure Water An experimental reaction was carried out using a 5 cc-tubular autoclave (tube bomb reactor).

$SiO_2$ nanoparticles 0.1 g was charged in a reactor tube with pure water 2.5 cc and cysteine 100 mg. The reactor tube was put in a heating furnace preliminarily set to 400° C., and heated. The pressure is 390 bar on the assumption of pure water. It took 1.5 min to raise the temperature. The reaction was carried out for 10 min. The reaction was stopped by putting the reactor tube to cold water. The recovered particles are perfectly dispersed in water more satisfactorily than in the suspended state before reaction. This shows that coagulation of $SiO_2$ is prevented by donation of hydrophilic groups to enhance the dispersibility.

Similarly to Examples 1 and 2, such a remarkable difference cannot be observed only by mixing a modifying agent without reaction, showing that this is not resulted from physical adsorption of a modifying group. According to the IR spectral measurement of the resulting particles, COOH and $NH_2$ groups are reduced, while linkages of Si—N—R and SIO—(CO)R are observed on the surface. Accordingly, the formation of covalent bond by the reaction could be confirmed.

Example 4

Organic Modification of Metal Oxide Fine Particles in High-Temperature, High-Pressure Water in Coexistence of Acid An experimental reaction was carried out using a 5-cc tubular autoclave (tube bomb reactor).

$Al_2O_3$ nanoparticles 0.1 g was charged in a reactor tube with 0.1M aqueous solution of $H_2SO_4$ 2.5 cc and hexanal 0.1 cc. The reactor tube was put in a heating furnace preliminarily set to 400° C., and heated. The pressure is 390 bar on the assumption of pure water. It took 1.5 min to raise the temperature. The reaction was carried out for 10 min. The reaction was stopped by putting the reactor tube to cold water. The product was recovered by repeating washing with water and washing with chloroform twice. An experiment for recovering the product not with chloroform but with hexanol was also carried out in the same manner.

In case of using pure water without addition of the acid, the recovered product is in a state precipitated in the bottom of the chloroform phase (the lower phase). This is the same as the result of the experiment without surface treatment. In contrast, when the surface modification is performed in the coexistence of the acid, the product is laid in a state partially suspended in the chloroform phase. When recovered with hexanol, the product is partially suspended in the hexanol and partially collected to the interface between hexanol (the upper phase) and water. This shows that the surface treatment reaction progresses by the coexistence of the acid. Even in such a reaction system where the organic modification is difficult to progress, the reaction can be progressed by the coexistence of the acid. The same experiment was carried out for ZnO which was difficult to modify, and it was confirmed that the coexistence of the acid enables the modification thereof.

Example 5

Long-Chain Organic Modification of Metal Oxide Fine Particles in High-Temperature, High-Pressure Water An experimental reaction was carried out using a 5 cc-tubular autoclave (tube bomb reactor).

$SiO_2$ nanoparticles 0.1 g was charged in a reactor tube with pure water 1.5 cc and dodecanal 1 cc. The reactor tube was put in a heating furnace preliminarily set to 400° C., and heated. The pressure is 390 bar on the assumption of pure water. It took 1.5 min to raise the temperature. The reaction was carried out for 10 min. The reaction was stopped by putting the reactor tube to cold water. The product was recovered by repeating washing with water and washing with chloroform twice. The same experiment was carried out by use of hexanal.

In case of using no decanal, the recovered product was in a state suspended in water. In contrast, when the modification was performed, the particles were collected to the interface between chloroform and water at 400° C., showing that the modification was attained. In case of using hexanal, the reaction was satisfactorily progressed at 300° C. and 400° C., and a slight progress of the reaction was confirmed further at 200° C. However, in case of using dodecanal, satisfactory surface modification could be performed at 400° C., but the reaction was not progressed at all at 200° C. Even at 300° C., the degree of progress of the reaction was low, compared with the case of hexanal.

Sufficient examples for the phase behavior of alkane-water phase were reported, and formation of a heterogeneous phase was probably caused at low temperature, drawing up the phase behavior of the dodecane-water system.

Example 6

Organic Modification of Metal Oxide Fine Particles in High-Temperature, High-Pressure Water An experimental reaction was carried out using a 5-cc tubular autoclave (tube bomb reactor). $TiO_2$ nanoparticles 0.1 g was charged in a reactor tube with pure water 2.5 cc and hexanoic acid 0.1 cc. The reactor tube was put in a heating furnace preliminarily set to 400° C., and heated. The pressure is 390 bar on the assumption of pure water. It took 1.5 min to raise the temperature. The reaction was carried out for 10 min. The reaction was stopped by putting the reactor tube to cold water. The product was recovered by repeating washing with water and washing with chloroform twice. The recovered product is shown in FIG. 10.

Figure 10:
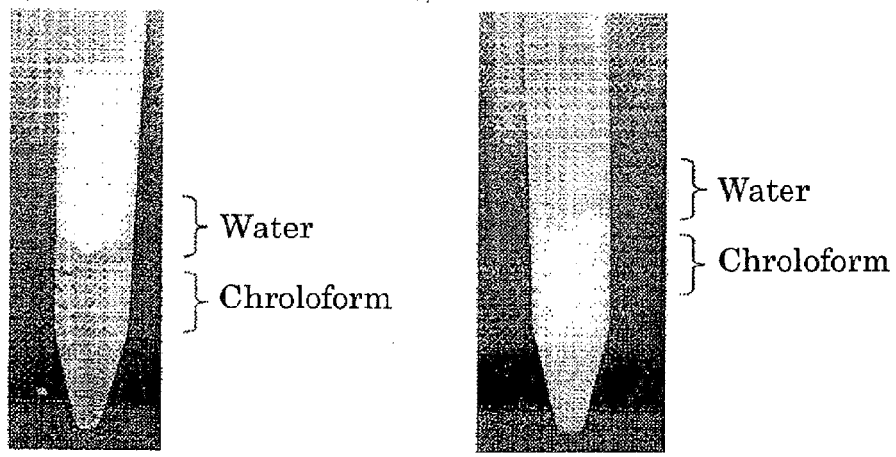
FIG. 10 shows metal oxide fine particles ($TiO_2$ nanoparticles) surface-modified with hexanoic acid by the technique of the present invention (on the right), comparatively with non-modified fine particles (on the left)
Figure 11:
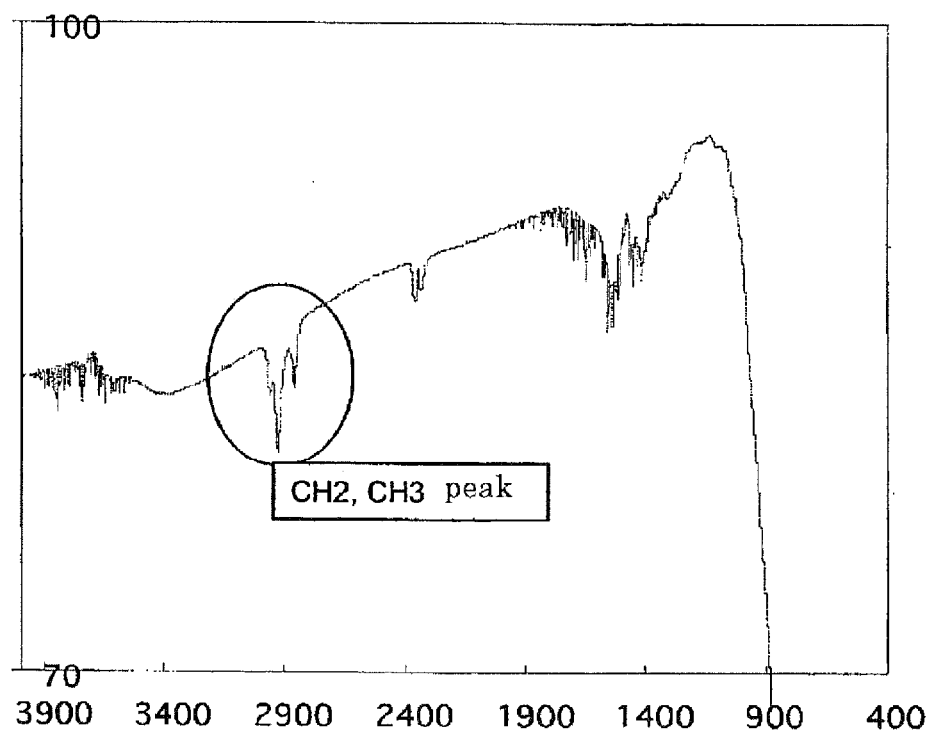
FIG. 11 shows an IR spectrum of the modified particles resulted from surface modification of metal oxide fine particles ($TiO_2$ nanoparticles) with hexanoic acid by the technique of the present invention.

In case of using no hexanoic acid or performing no surface modification, the recovered product is in a state suspended in water (the upper phase) as shown in the left of FIG. 10. However, the nanoparticles surface-modified with hexanoic acid were transferred to the chloroform phase (the lower phase). This suggests that hydrophilic groups (OH) are generated on the surface of $TiO_2$ nanoparticles when the surface modification is not performed. In contrast, hydrophobic groups are introduced to the particle surface as a result of surface modification with hexanoic acid. Such a remarkable difference cannot be observed only by mixing a modifying agent without reaction, showing that this is not caused physical adsorption of a modifying group. According to the IR spectral measurement of the resulting particles, as shown in FIG. 11, peaks of $CH_3$ and $CH_2$ couplings were observed. According to this, the formation of covalent bond by the reaction could be confirmed.

By using high-temperature, high-pressure water as a reaction solvent, surface modification of a metal oxide can be performed. The same result is also obtained in the use of hexanamide.

Example 7

Figure 12:
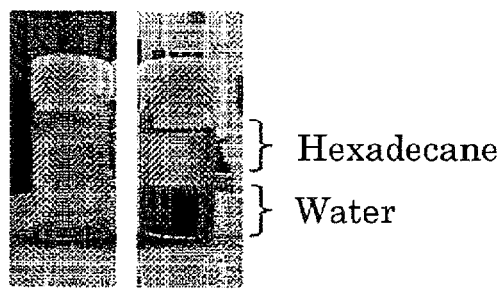
FIG. 12 shows metal oxide fine particles ($TiO_2$ nanoparticles) surface-modified with asparaginic acid by the technique of the present invention (on the right), comparatively with non-modified particles (on the left)

Organic Modification of Meal Oxide Fine Particles in High-Temperature, High-Pressure Water with Amino Acid An experimental reaction was carried out using a 5-cc tubular autoclave (tube bomb reactor). $TiO_2$ nanoparticles 0.1 g was charged in a reactor tube with pure water 2.5 cc and asparaginic acid 100 mg. The reactor tube was put in a heating furnace preliminarily set to 400° C., and heated. The pressure is 390 bar on the assumption of pure water. It took 1.5 min to raise the temperature. The reaction was carried out for 10 min. The reaction was stopped by putting the reactor tube to cold water. The recovered particles were perfectly dispersed in water more satisfactorily (the right of FIG. 12) than in the state suspended in water before the reaction (the light of FIG. 12). This shows that coagulation of $TiO_2$ can be prevented by donation of hydrophilic groups to enhance the dispersibility.

Similarly to Examples 2 and 6, such a remarkable difference cannot be observed only by mixing a modifying agent without reaction, showing that this is not caused by physical adsorption of a modifying group. According to the IR spectral measurement of the resulting particles, COOH and $NH_2$ groups were reduced, while linkages of Ti—N—R, TiO—(CO)R and Ti—R were observed on the surface. According to this, the formation of covalent bond by the reaction could be confirmed.

Example 8

Figure 13:
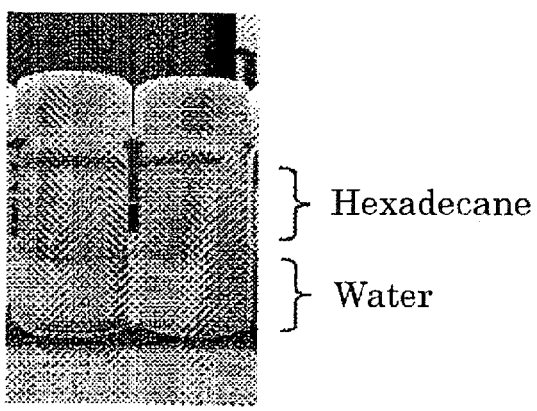
FIG. 13 comparatively shows metal oxide fine particles ($SiO_2$ nanoparticles) surface-modified with decanoic acid (on the right) and with decane amine (on the left) by the technique of the present invention, respectively.

Organic Modification of Metal Oxide Fine Particles in High-Temperature, High-Pressure Water with Long-Chain Hydrocarbon An experimental reaction was carried out using a 5-cc tubular autoclave (tube bomb reactor). $SiO_2$ nanoparticles 0.1 g was charged in a reactor tube with pure water 1.5 cc and decanoic acid 1 cc. The reactor tube was put in a heating furnace preliminarily set to 400° C., and heated. The pressure is 390 bar on the assumption of pure water. It took 1.5 min to raise the temperature. The reaction was carried out for 10 min. The reaction was stopped by putting the reactor tube to cold water. The product was recovered by repeating washing with water and washing with hexadecane twice. The recovered product is shown in the right of FIG. 13. In case of using no decanoic acid, the recovered product is in a state suspended in water, but when the modification is performed, it is dispersed in hexadecane as shown in the right of FIG. 13, showing that the modification was attained.

The same experiment was carried out for decanal and decane amine, and the same result was obtained. The state of organically modified nanoparticles with decane amine is shown on the left of FIG. 13. It shows that the particles can be surface-modified with a long-chain organic material hardly soluble to water at about room temperature.

Example 9

In-Situ Organic Modification in High-Temperature, High-Pressure Hydrothermal Synthesis (1)

Figure 14:
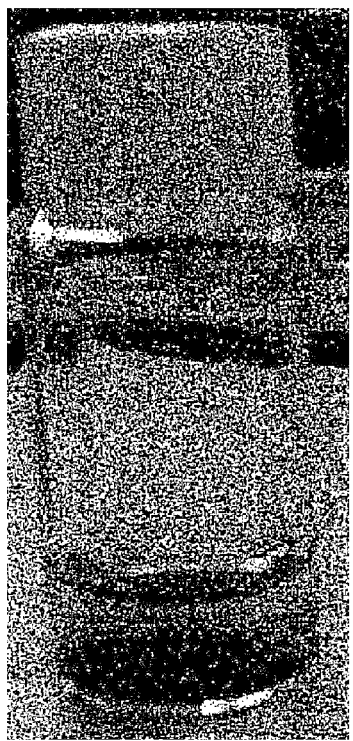
FIG. 14 shows metal oxide fine particles hydrothermally synthesized by the technique of the present invention, the surface of which is organically modified in situ in the coexistence of hexanol (on the right), comparatively with non-modified particles (on the left)
Figure 14:
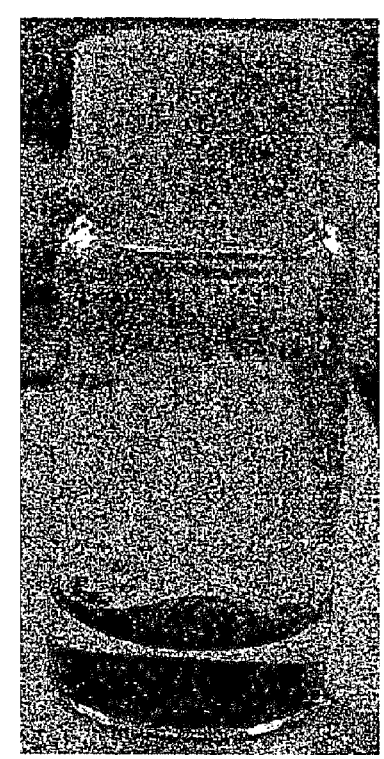

An experimental reaction was carried out using a 5-cc tubular autoclave (tube bomb reactor). Hydrogen peroxide was added to 0.01 Mol/l of $Mn(NO_3)_2$ aqueous solution to have an amount of 0.05 Mol/l, the resulting mixture 2.5 g was charged in a reactor tube, and hexanol 0.1 cc was further charged therein. The reactor tube was put in a heating furnace preliminarily set to 400° C., and heated. The pressure is 390 bar on the assumption of pure water. It took 1.5 min to raise the temperature. The reaction was carried out for 10 min, and the product was recovered. The recovered product is shown in FIG. 14. In case of using no hexanol, the recovered product is in a state suspended in water as shown in FIG. 14a), and this is caused by generation of hydrophilic groups. In contrast, when the modification was performed, the product was laid in a state perfectly separated from water phase as shown in FIG. 14b).

In general, although it is technically difficult to recover nanoparticles generated in an aqueous solution from water phase, the particles can be easily separated and recovered from the aqueous solution according to the technique of the present invention. Although it is not easy to modify a preliminarily generated metal oxide with hexanol, the organic modification of the oxide nanoparticle surface can be performed by the in-situ surface modification.

Example 10

In-Situ Organic Modification in High-Temperature, High-Pressure Hydrothermal Synthesis (2)

An experimental reaction was carried out using a 5-cc tubular autoclave (tube bomb reactor). Hydrogen peroxide was added to 0.01 Mol/l of $Zn(NO_3)_2$ aqueous solution to have an amount of 0.05 Mol/l, the resulting mixture 2.5 g was charged in a reactor tube, and hexanol 0.1 cc was further charged therein. The reactor tube was put in a heating furnace preliminarily set to 400° C., and heated. The pressure is 390 bar on the assumption of pure water. It took 1.5 min to raise the temperature. The reaction was carried out for 10 min, and the product was recovered. In case of using no hexanol, the recovered product is in a state suspended in water, and this is caused by generation of hydrophilic groups. In contrast, when the modification was performed, the product was laid in a state perfectly separated from water phase. The same experiment was carried out using $Zn(COOH)_2$ in addition to $Zn(NO_3)_2$.

In every case, as shown in Example 4, it was difficult for ZnO to perform satisfactory modification without the coexistence of an acid. According to the present technique, the in-situ surface modification can be performed. Particularly, in case of a formate, the generated acid is HCOOH, the decomposition of which to $H_2+CO_2$ in a high temperature field is known, and it does not function as the acid. The reason that satisfactory surface modification can be attained despite of it is attributable to that the dehydration reaction of hydroxyl group OH with an organic modifying agent in the initial stage of crystal growth satisfactorily progresses.

Figure 15:
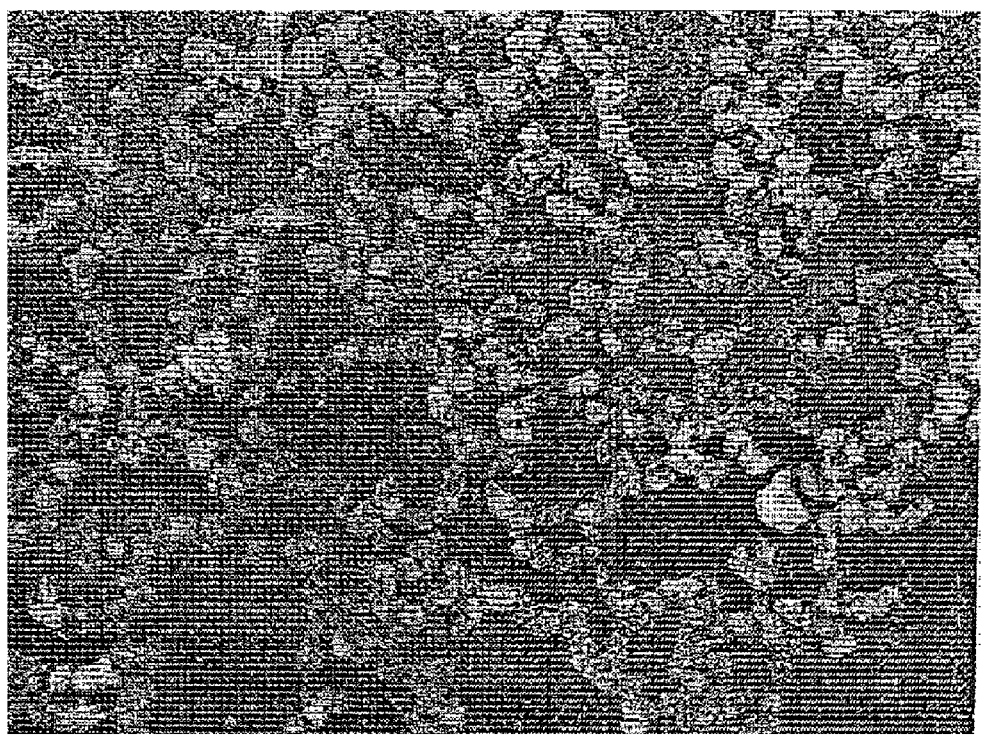
FIG. 15 shows metal oxide fine particles (on the lower side) organically modified by the technique of the present invention and non-modified particles (on the upper side) by TEM images.
Figure 15:
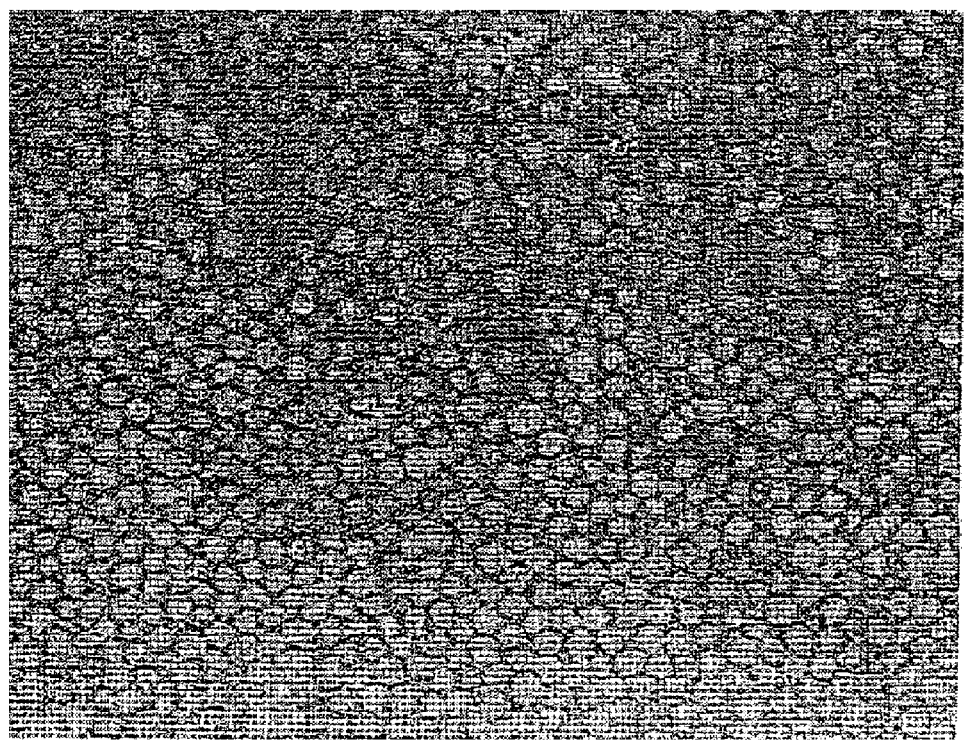

TEM images of the particles obtained according to the present technique are shown in FIG. 15. It was observed from FIG. 15 that surface-modified particles (the lower side) are uniform fine particles, compared with those not subjected to surface modification (the upper side). The particle growth is inhibited by the surface modification, and fine particles can be obtained.

Example 11

In-Situ Organic Modification in High-Temperature, High-Pressure Hydrothermal Synthesis (3)

Figure 16:
FIG. 16 shows metal oxide fine particles hydrothermally synthesized by the technique of the present invention, the surface of which is organically modified in the coexistence of hexanol in situ (on the right), comparatively with non-modified particles (on the left)
Figure 16:

An experimental reaction was carried out using a 5-cc tubular autoclave (tube bomb reactor). Hydrogen peroxide was added to 0.01 Mol/l of $Mn(NO_3)_2$ aqueous solution to have an amount of 0.1 Mol/l, the resulting mixture 2.5 g was charged in a reactor tube, and hexanol 0.1 cc was further charged therein. The reactor tube was put in a heating furnace preliminarily set to 400° C., and heated. The pressure is 390 bar on the assumption of pure water. It took 1.5 min to raise the temperature. The reaction was carried out for 10 min, and the product was recovered. The recovered product is shown in FIG. 16*b*). In case of using no hexanol, the recovered product is in a state suspended in water as shown in FIG. 16*a*), and this is caused by generation of hydrophilic groups. In contrast, when the modification was performed, the product was laid in a state perfectly separated from water phase.

Example 12

In-Situ Organic Modification in High-Temperature, High-Pressure Hydrothermal Synthesis (4)

Figure 17:
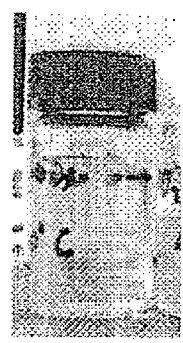
FIG. 17 shows the result of in-situ organic modifications of metal oxide fine particles ($CeO_2$ nanoparticles) with varied treatment temperatures by the technique of the present invention.
Figure 17:
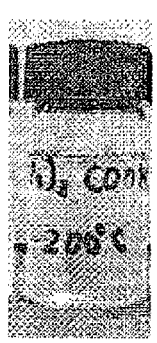
Figure 17:
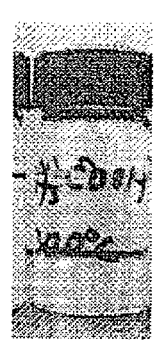
Figure 17:
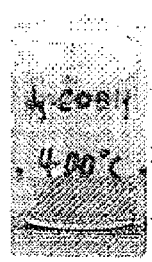

An experimental reaction was carried out using a 5-cc tubular autoclave (tube bomb reactor). Hydrogen peroxide was added to 0.01 Mol/l of $Ce(NO_3)_2$ aqueous solution to have an amount of 0.01 Mol/l, the resulting mixture 2.5 g was charged in a reactor tube, and hexanoic acid 0.1 cc was further charged therein. The reactor tube was put in a heating furnace preliminarily set to 400° C., and heated. The pressure is 390 bar on the assumption of pure water. It took 1.5 min to raise the temperature. The reaction was carried out for 10 min, and the product was recovered. The recovered product is shown in FIG. 17. In case of using no hexanoic acid, the recovered product is in a state suspended in water as shown in FIG. 17*a*), and this is caused by generation of hydrophilic groups. Although the treatment was not progressed at 200° C. (FIG. 17*b*)), the product was laid in a state perfectly separated from water phase at 300° C. and 400° C. as shown in FIG. 17 *c*) and d).

In the modification by use of the hexanoic acid insoluble to water, the treatment does not progress at a low temperature of 200° C. since a homogenous layer cannot formed with water, but progresses at 300° C. or 400° C., where the dielectric constant of water is reduced to enable the formation of the homogeneous phase with a modifying agent. This shows also the presence of a case essentially requiring a treatment in a high-temperature range where the reaction can sufficiently progress.

Example 13

In-Situ Organic Modification in High-Temperature, High-Pressure Hydrothermal Synthesis (5)

With respect to $Fe_2O_3$, NiO, ZnO and $CO_2O_3$, reactions were carried out in coexistence of hexanol, hexanoic acid, hexylamine, hexanal, and hexane thiol in the same manner as Examples 9-12. The results are collectively shown in Tables 1-4.

TABLE 1

| | | $Fe_2O_3$ | | | | | |
|---|---|---|---|---|---|---|---|
| | | None | R—OH | R—CHO | R—COOH | R—$NH_2$ | R—SH |
| 200° C. | W | a little, red | red | | little | | |
| | Int. | w | w | w, red thick layer | o | w, red | w, red |
| | O | | | | more, red | | |
| 300° C. | W | red | a little, red | | little | | |
| | Int. | w | o | o, red thin layer | w, red thick layer | o, red | o, brown |
| | O | | | more | | | more |
| 400° C. | W | red | a little | | | | |
| | Int. | w | w | w, brown | w, brown thick layer | o, brown | gray |
| | O | a little $L_{400} > L_{300} > L_{200}$ $S_{200} > S_{300} > S_{400}$ NP exist mostly in water phase. | more, red $L_{200} > L_{300} > L_{400}$ $S_{300} > S_{400} > S_{200}$ NP exist mostly in water phase at 200° C.; in both water phase and organic phase at 300° C.; and mostly in organic phase at 400° C. | more $S_{300} > S_{400} > S_{200}$ NP exist mostly in water phase at 200° C.; and mostly in organic phase at 300° C. and at 400° C. | a little $S_{200} > S_{300} > S_{400}$ NP are almost practically dissolved in organic phase at 200° C.; and exist mostly in water phase at 300° C. and at 400° C. | more $S_{400} > S_{300} > S_{200}$ NP exist mostly in water phase at 200° C. and 300° C.; and mostly in organic phase at 400° C. | $S_{300} > S_{400} > S_{200}$ NP exist mostly in water phase at 200° C.; and mostly in boundary phase at 400° C., most of which are present with organic phase-dependency. |

TABLE 2

| | | None | R—OH | R—CHO | R—COOH | R—$NH_2$ | R—SH |
|---|---|---|---|---|---|---|---|
| 200° C. | W | green | | green | a little | a little | |
| | Int. | o | o | o | w | w | w |
| | O | more, white | white | a little, white | little | little | brown |
| 300° C. | W | green | a little | more, green | | a little | |
| | Int. | o | w | w | w | w | o |
| | O | | little, brown | | green | green | more, green |
| 400° C. | W | | | | | | a little |
| | Int. | w, more & brown | w | o | o | o | w |
| | O | green $S_{200} > S_{300} > S_{400}$ | green $S_{200} > S_{400} > S_{300}$ NP exist mostly in | more, green $S_{400} > S_{300} > S_{200}$ NP exist mostly in | brown $S_{400} > S_{300} > S_{200}$ The quantity of NP | more, black $S_{400} > S_{300} > S_{200}$ The quantity of NP | more $S_{300} > S_{400} > S_{200}$ NP almost |

TABLE 2-continued

| None | R—OH | R—CHO | R—COOH | R—NH$_2$ | R—SH |
|---|---|---|---|---|---|
| | water phase at 300° C.; and the quantity of NP present in both water phase and organic phase at 200° C. is smaller than in the cases of other temperatures. | The quantity of NP present in both water phase and organic phase at 200° C. is smaller than in the cases of other temperatures. | present in both water phase and organic phase at 200° C. is smaller than in the cases of other temperatures. | present in both water phase and organic phase at 200° C. is smaller than in the cases of other temperatures; and NP exist mostly in organic phase at 400° C. | practically exist in organic phase at 300° C. |

TABLE 3

ZnO

| | | None | R—OH | R—CHO | R—COOH | R—NH$_2$ | R—SH |
|---|---|---|---|---|---|---|---|
| 200° C. | W | | | | | | more |
| | Int. | w | w | w, white | w | w | |
| | O | more, white | more, white | a little | more, yellow | more, white | yellow |
| 300° C. | W | | | | | | |
| | Int. | w, more | o, thin layer | o | o | w, more | |
| | O | yellow | yellow | more, yellow | white | white yellow | more, yellow |
| 400° C. | W | | | | | | more |
| | Int. | | w, thick layer | w, more | w, more | o, a little | o, black |
| | O | | a little | white | white | | |
| | | | $L_{400} > L_{200} > L_{300}$ | | $L_{300} > L_{400} > L_{200}$ | | |
| | | $S_{200} > S_{300} > S_{400}$ | $S_{300} > S_{200} > S_{400}$ | $S_{300} > S_{200} > S_{400}$ | $S_{300} > S_{200} > S_{400}$ | $S_{200} > S_{300} > S_{400}$ | $S_{300} > S_{200} > S_{400}$ |

TABLE 4

Co$_2$O$_3$

| | | None | R—OH | R—CHO | R—COOH | R—NH$_2$ | R—SH |
|---|---|---|---|---|---|---|---|
| 200° C. | W | a little, red | red | red | red | | |
| | Int. | o | o | o | o | o | o |
| | O | | | | | gray | little, red |
| 300° C. | W | yellow | more, yellow | more, yellow | more, yellow | | |
| | Int. | w | w | w | w, thin layer little | more, gray | o |
| | O | | | | | | red |
| 400° C. | W | more, gray | more, yellow | yellow | yellow | more, gray | a little |
| | Int. | w | w | o | w, thin layer | o | |
| | O | a little | little | a little | a little | | more, gray |
| | | $L_{200} > L_{300} > L_{400}$ | $L_{200} > L_{300} > L_{400}$ | $L_{200} > L_{300} > L_{400}$ | | | |
| | | $S_{200} > S_{300} > S_{400}$ | $S_{200} > S_{300} > S_{400}$ | $S_{200} > S_{300} > S_{400}$ | $S_{200} > S_{300} > S_{400}$ | $S_{300} > S_{200} > S_{400}$ The reagent with —NH2 is excellent at 300° C. because separation is almost perfectly performed; and the solubility is lower both in water phase and in organic phase than that in other cases at 400° C. | $S_{400} > S_{300} > S_{200}$ Usable as a satisfactory surface modifying agent because of high solubility of NP to this reagent at 400° C. |

The respective notations in the tables mean as follows: None: No modifying agent, W: Water phase, Int.: Interface phase between water phase and organic phase, 0: Organic phase, a little: Existing a little, little: Existing only a little, w: Transferred from interface to water phase by slight vibration, o: Transferred from interface to oil phase by slight vibration, more: Existing more, NP: nanoparticles, L: Thickness of boundary phase with a subscript showing the treatment temperature, S: Solubility of NP in organic phase with a subscript showing the treatment temperature.

The comparison result as the whole is shown in Table 5.

TABLE 5

Fe$_2$O$_3$

| | |
|---|---|
| 1. At 200° C.: | $S_{-COOH} > S_{-CHO} > S_{-OH} > S_{-NH2} > S_{-SH}$ (—COOH is the best reagent) |
| 2. At 300° C.: | $S_{-CHO} > S_{-OH} > S_{-SH} > S_{-NH2} > S_{-COOH}$ (—CHO is the best reagent) |

TABLE 5-continued

| | |
|---|---|
| 3. At 400° C.: | $S_{-NH2} > S_{-CHO} > S_{-OH} > S_{-SH} > S_{-COOH}$ |

NiO

| | |
|---|---|
| 1. At 200° C.: | $S_{-SH} > S_{-OH} > S_{-COOH} > S_{-CHO} > S_{-NH2}$ |
| 2. At 300° C.: | $S_{-SH} > S_{-COOH} > S_{-NH2} > S_{-CHO} > S_{-OH}$ |
| 3. At 400° C.: | $S_{-NH2} > S_{-CHO} > S_{-SH} > S_{-OH} > S_{-COOH}$ |

ZnO

| | |
|---|---|
| 1. At 200° C.: | $S_{-NH2} > S_{-OH} > S_{-COOH} > S_{-SH} > S_{-CHO}$ |
| 2. At 300° C.: | $S_{-COOH} > S_{-OH} > S_{-CHO} > S_{-SH} > S_{-NH2}$ |
| 3. At 400° C.: | $S_{-COOH} > S_{-CHO} > S_{-OH} > S_{-NH2} > S_{-SH}$ |

Co$_2$O$_3$

| | |
|---|---|
| 1. At 200° C.: | $S_{-NH2} > S_{-OH} > S_{-SH} > S_{-CHO} > S_{-COOH}$ |
| 2. At 300° C.: | $S_{-NH2} > S_{-CHO} > S_{-SH} > S_{-COOH} > S_{-OH}$ |
| 3. At 400° C.: | $S_{-SH} > S_{-NH2} > S_{-COOH} > S_{-CHO} > S_{-OH}$ |

With respect to ZnO, the surface modification treatment can be performed in the same manner. The effect of the surface modification can be sufficiently obtained. However, in case of using hexanol, it could not be said that sufficient surface modification can be obtained in every case.

Therefore, the in-situ organic modification was carried out. The experimental method was the same as in Examples 8 and 9. Namely, the experimental reaction was carried out using a 5-cc tubular autoclave (tube bomb reactor). Hydrogen peroxide was added to 0.01 Mol/l of Zn(NO$_3$)$_2$ aqueous solution to have an amount of 0.1 Mol/l, the resulting mixture 2.5 g was charged in a reactor tube, and hexanol 0.1 cc was further charged therein. The reactor tube was put in a heating furnace preliminarily set to 200° C., 300° C. and 400° C., and heated. The pressure is 390 bar on the assumption of pure water. It took 1.5 min to raise the temperature. The reaction was carried out for 10 min, and the product was recovered. In case of using no hexanol, the recovered product was in a state suspended in water and oil phase, but the particles were transferred to the oil phase by the surface modification using hexanol. Thus, a sufficient surface modification effect is obtained.

Even if the surface modification cannot be sufficiently performed on the particles generated once, sufficient surface modification can be performed by the in-situ surface modification.

The results of the same surface modification treatment of nanoparticles of ZnO, CeO$_2$, Al$_2$O$_3$, SnO$_2$, and SiO$_2$ are collectively shown in Tables 6 and 7. Table 6 comparatively shows the result of surface modification of the fine particles of each metal oxide, and Table 7 shows the result of the in-situ modification thereof. In the tables, ○ shows that transfer of particles to organic phase was recognized, and x shows that transfer of particles to organic phase was not clearly recognized. Δ shows that the organic modification progressed although it was insufficient.

TABLE 6

Surface modification of metal oxide fine particles

| | OH | CHO | COOH | NH$_2$ | SH |
|---|---|---|---|---|---|
| ZnO | | | | | |
| 200° C. | X | ○ | ○ | X | X |
| 300° C. | X | ○ | ○ | X | X |
| 400° C. | X | | ○ | X | ○ |
| CeO$_2$ | | | | | |
| 200° C. | X | ○ | ○ | ○ | ○ |
| 300° C. | X | ○ | ○ | ○ | X |

TABLE 6-continued

Surface modification of metal oxide fine particles

| | OH | CHO | COOH | NH$_2$ | SH |
|---|---|---|---|---|---|
| 400° C. | X | ○ | ○ | X | X |
| Al$_2$O$_3$ | | | | | |
| 200° C. | X | ○ | ○ | X | X |
| 300° C. | X | ○ | ○ | X | X |
| 400° C. | X | ○ | ○ | X | X |
| SnO$_2$ | | | | | |
| 200° C. | X | ○ | ○ | X | X |
| 300° C. | X | ○ | ○ | X | X |
| 400° C. | X | X | ○ | X | X |
| TiO$_2$ | | | | | |
| 400° C. | X | ○ | X | ○ | X |
| SiO$_2$ | | | | | |
| 400° C. | X | ○ | X | ○ | X |

TABLE 7

In-situ modification

| CeO$_2$ | OH | CHO | COOH | NH$_2$ | SH |
|---|---|---|---|---|---|
| 200° C. | X | ○ | ○ | X | X |
| 300° C. | X | ○ | ○ | X | X |
| 400° C. | X | ○ | ○ | ○ | ○ |

| | none | OH | CHO | COOH | NH$_2$ | SH |
|---|---|---|---|---|---|---|
| NiO | | | | | | |
| 200° C. | ○ | X | Δ | Δ | X | ○ |
| 300° C. | X | X | X | ○ | ○ | ○ |
| 400° C. | X | X | ○ | ○ | ○ | ○ |
| TiO$_2$ | | | | | | |
| 200° C. | X | X | ○ | X | X | X |
| 300° C. | X | X | | | | ○ |
| 400° C. | X | X | ○ | | | ○ |
| Co$_2$O$_3$ | | | | | | |
| 200° C. | X | X | X | X | ○ | Δ |
| 300° C. | X | X | X | X | ○ | ○ |
| 400° C. | X | X | Δ | X | Δ | ○ |
| ZnO | | | | | | |
| 200° C. | X | ○ | X | ○ | ○ | Δ |
| 300° C. | X | ○ | ○ | ○ | ○ | ○ |
| 400° C. | X | ○ | ○ | ○ | X | Δ |
| Fe$_2$O$_3$ | | | | | | |
| 200° C. | X | X | X | ○ | X | X |
| 300° C. | X | Δ | ○ | X | Δ | ○ |
| 400° C. | X | ○ | ○ | X | ○ | Δ |

As is apparent from the comparison of Tables 1-7, the same in-situ surface modification effect is obtained in ZnO, CeO$_2$, TiO$_2$ and the like.

Example 14

In-Situ Organic Modification in High-Temperature, High-Pressure Hydrothermal Synthesis (6)

According to the same manner as in Examples 8 and 9, syntheses of Fe$_2$O$_3$, CO$_2$O$_3$, NiO, ZnO, and TiO$_2$ were carried out in the coexistence of hexanol, hexanoic acid, hexylamine, hexanal, and hexane thiol. The results are collectively shown in Table 7. Based on the case of using no surface modifying agent, the magnitude of the surface modification effect is expressed by indexes of 1-10.

TABLE 8

|  | —OH | —CHO | —COOH | —NH$_2$ | —SH |
|---|---|---|---|---|---|
| TiO$_2$ | | | | | |
| 200° C. | 6 | 6 | 1 | 1 | 8 |
| 300° C. | 8 | 5 | 4 | 3 | 9 |
| 400° C. | 9 | 8 | 7 | 6 | 10 |
| NiO | | | | | |
| 200° C. | 6 | 1 | 1 | 2 | 1 |
| 300° C. | 5 | 4 | 5 | 7 | 7 |
| 400° C. | 7 | 10 | 10 | 10 | 8 |
| ZnO | | | | | |
| 200° C. | 3 | 3 | 3 | 3 | 3 |
| 300° C. | 6 | 10 | 8 | 4 | 5 |
| 400° C. | 7 | 9 | 9 | 5 | 6 |
| Fe$_2$O$_3$ | | | | | |
| 200° C. | 4 | 6 | 8 | 6 | 6 |
| 300° C. | 7 | 7 | 7 | 7 | 10 |
| 400° C. | 9 | 8 | 5 | 9 | 7 |
| Co$_2$O$_3$ | | | | | |
| 200° C. | 2 | 2 | 6 | 7 | 8 |
| 300° C. | 2 | 7 | 7 | 7 | 9 |
| 400° C. | 2 | 9 | 8 | 6 | 10 |

It was found from the table that the degree of progress of the surface modification reaction is varied depending on not only the temperature but also the reactant. This reason is that even if no surface modification is performed, some reactants can be dispersed in water while sufficiently retaining hydrophilic groups as ZnO and NiO, while some reactants can be dispersed in oil phase with minimized hydrophobic groups as TiO$_2$, and the stability or reactivity of the functional group on the particle surface is thus varied even if the in-situ surface modification is performed in a particle generating field. In case of modification with aldehyde or modification with amine, surface modification can be obtained more satisfactorily at 300° C. than at 400° C. This is resulted from that a hydrolysis reaction is caused in a high-temperature field. Namely, the optimum condition is 300-400° C., and an excessively high temperature conceivably causes the influence of the reverse reaction.

The present invention provides organically modified fine particles (particularly, nanoparticles) having hydrocarbon strongly bonded with the surface of fine particles, particularly, organically modified metal oxide fine particles, a process for producing the same, and further a method for recovering or collecting fine particles such as nanoparticles, with an intention to promote the use of nanoparticles showing various unique excellent properties, characteristics and functions as industrial materials and pharmaceutical and cosmetic materials such as ceramic nano-structure modified material, optical functional coating material, electromagnetic shielding material, secondary battery material, fluorescent material, electronic part material, magnetic recording material, and abrasive material.

It will be obvious that the present invention can be executed beyond the above-mentioned description and examples. In view of the above-mentioned teaching, a lot of alterations and modifications of the present invention can be made, and such alterations and modifications are therefore intended to be embraced by the appended claims.

I claim:

1. A process for producing organically modified metal oxide nanoparticles, which comprises:
    reacting an organic modifying agent with the surface of a metal oxide nanoparticle in a reaction field of high-temperature, high-pressure water to form organically modified metal oxide nanoparticles
    wherein an optionally substituted or unsubstituted hydrocarbon group is bonded to the surface of said nanoparticle through a linkage selected from the group consisting of a covalent bond, an ether bond, an ester bond, a bond through an N atom, a bond through an S atom, a metal-C— bond, a metal-C═ bond, and a metal-(C═O)— bond, and
    the reaction field contains a coexistent material and the coexistent material used is a solvent for promoting the phase-homogenization of the organic modifying agent and water.

2. The process according to claim 1, wherein the high-temperature, high-pressure water is water under supercritical or subcritical conditions.

3. The process according to claim 1, wherein the high-temperature, high-pressure water is water under conditions at the critical pressure or a pressure above the critical point and/or at the critical temperature or a temperature above the critical point.

4. The process according to claim 1, wherein said organically modified metal oxide nanoparticles are formed in a reaction field where water is present under conditions at a temperature ranging from 250 to 500° C. and a pressure ranging from 10 to 30 MPa.

5. The process according to claim 1, wherein said hydrocarbon group is a long-chain hydrocarbon group having a chain having 1, 2, 3 or more carbon atoms.

6. The process according to claim 1, wherein said organic modifying agent is selected from the group consisting of an alcohol, an aldehyde, a carboxylic acid, an amine, a thiol, an amide, a ketone, an oxime, a phosgene, an enamine, an amino acid, a peptide and a sugar.

7. The process according to claim 1, wherein said solvent is selected from the group consisting of methanol, ethanol, propanol, i-propanol, butanol, i-butanol, t-butanol and ethylene glycol.

8. The process according to claim 1, wherein the reaction is performed in the coexistence of an acid.

9. The process according to claim 8, wherein the acid is selected from the group consisting of nitric acid, sulfuric acid, hydrochloric acid, bromic acid, formic acid, acetic acid, propionic acid and toluenesulfonic acid.

10. The process according to claim 1, wherein the reaction ratio of the organic modifying agent is regulated by controlling a factor selected from the group consisting of temperature, acid concentration and reaction time.

11. The process according to claim 1, wherein said hydrocarbon group has a hydrophilic group and the products are organically modified metal oxide nanoparticles well dispersed in an aqueous solution.

12. The process according to claim 1, wherein the average size of the nanoparticles is:
    (1) 100 nm or less;
    (2) 50 nm or less;
    (3) 20 nm or less;
    (4) 10 nm or less; or
    (5) 5 nm or less.

13. A process for producing organically modified metal oxide nanoparticles, which comprises:
producing metal oxide nanoparticles in the coexistence of an organic modifying agent in a supercritical hydrothermal synthesis reaction field, thereby forming organically modified metal oxide nanoparticles
wherein an optionally substituted or unsubstituted hydrocarbon group is bonded to the surface of said nanoparticle through a linkage selected from the group consisting of a covalent bond, an ether bond, an ester bond, a bond through an N atom, a bond through an S atom, a metal-C— bond, a metal-C= bond, and a metal-(C=O)— bond, and the reaction field contains a coexistent material and the coexistent material used is a solvent for promoting the phase homogenization of the organic modifying agent with water.

14. The process according to claim 13, wherein the particle size of the generated particles is adjusted to a smaller particle size as compared with those where supercritical hydrothermal synthesis is performed in the absence of an organic modifying agent.

15. The process according to claim 13, wherein the average size of the nanoparticles is:
(1) 100 nm or less;
(2) 50 nm or less;
(3) 20 nm or less;
(4) 10 nm or less; or
(5) 5 nm or less.

16. A process for producing organically modified metal oxide nanoparticles, which comprises:
subjecting a metallic compound to a hydrothermal reaction in a reaction field of high-temperature, high-pressure water to form metal oxide nanoparticles; and
reacting an organic modifying agent with the surface of the resulting metal oxide nanoparticle to form organically modified metal oxide nanoparticles
wherein an optionally substituted or unsubstituted hydrocarbon group is bonded to the surface of said nanoparticle through a linkage selected from the group consisting of a covalent bond, an ether bond, an ester bond, a bond through an N atom, a bond through an S atom, a metal-C-bond, a metal —C= bond, and a metal —(C=O)— bond, and
the reaction field contains a coexistent material and the coexistent material used is a solvent for promoting the phase homogenization of the organic modifying agent with water.

17. The process according to claim 16, wherein the high-temperature, high-pressure water is water under supercritical or subcritical conditions.

18. The process according to claim 16, wherein
the high-temperature, high-pressure water is water under conditions at the critical pressure or a pressure above the critical point and/or at the critical temperature or a temperature above the critical point.

19. The process according to claim 16, wherein the organically modified metal oxide nanoparticles are formed in a reaction field where water is present under conditions at a temperature ranging from 250 to 500° C. and a pressure ranging from 10 to 30 MPa.

20. The process according to claim 16, wherein said hydrocarbon group is a long-chain hydrocarbon group having a chain having 1, 2, 3 or more carbon atoms.

21. The process according to claim 16, wherein an organic modifying agent is selected from the group consisting of an alcohol, an aldehyde, a carboxylic acid, an amine, a thiol, an amide, a ketone, an oxime, a phosgene, an enamine, an amino acid, a peptide, and a sugar.

22. The process according to claim 16, wherein said solvent is selected from the group consisting of methanol, ethanol, propanol, i-propanol, butanol, butanol, t-butanol and ethylene glycol.

23. The process according to claim 16, wherein the reaction is performed in the coexistence of an acid.

24. The process according to claim 23, wherein said acid is selected from the group consisting of nitric acid, sulfuric acid, hydrochloric acid, bromic acid, formic acid, acetic acid, propionic acid and toluenesulfonic acid.

25. The process according to claim 16, wherein the reaction ratio of the organic modifying agent is regulated by controlling a factor selected from the group consisting of temperature, acid concentration and reaction time.

26. The process according to claim 16, wherein said hydrocarbon group has a hydrophilic group and the products are organically modified metal oxide nanoparticles well dispersed in an aqueous solution.

27. The process according to claim 16, wherein the average size of the nanoparticles is:
(1) 100 nm or less;
(2) 50 nm or less;
(3) 20 nm or less;
(4) 10 nm or less; or
(5) 5 nm or less.

28. A process for recovering or collecting metal oxide nanoparticles, which comprises:
reacting an organic modifying agent (organic modifier) with the surface of a metal oxide nanoparticle in the reaction field of high-temperature, high-pressure water wherein the reaction field contains a coexistent material and the co-existent material used is a solvent for promoting the phase-homogenization of the organic modifying agent and water, to bond an optionally substituted or unsubstituted hydrocarbon group to the surface of said nanoparticle through a linkage selected from the group consisting of a covalent bond, an ether bond, an ester bond, a bond through an N atom, a bond through an S atom, a metal-C— bond, a metal-C= bond, and a metal-(C=O)— bond, whereby the surface of said nanoparticle is organically modified; and
(1) precipitating the resultant metal oxide nanoparticles dispersed in an aqueous solution and then recovering metal oxide nanoparticle sediments;
(2) transferring the resultant metal oxide nanoparticles, dispersed in an aqueous solution, into an organic solvent phase and recovering a metal oxide nanoparticle-containing organic layer; or
(3) collecting the resultant metal oxide nanoparticles from the interface between organic and aqueous phases.

29. The process according to claim 28, wherein said metal oxide nanoparticles are formed by subjecting a metallic compound to a hydrothermal reaction in the reaction field of high-temperature, high-pressure water, and reacting an organic modifying agent with the surface of the resulting metal oxide nanoparticle to form organically modified metal oxide nanoparticles wherein an optionally substituted or unsubstituted hydrocarbon group is bonded to the surface of said nanoparticle through a covalent bond.

30. The process according to claim 28, wherein the high-temperature, high-pressure water is water under supercritical or subcritical conditions.

31. The process according to claim 28, wherein the high-temperature, high-pressure water is water under conditions at the critical pressure or a pressure above the critical point and/or at the critical temperature or a temperature above the critical point.

32. The process according to claim 28, wherein said organically modified metal oxide nanoparticles are formed in a reaction field where water is present under conditions at a temperature ranging from 250 to 500° C. and a pressure ranging from 10 to 30 MPa.

33. The process according to claim 28, wherein the organic modification of said nanoparticle surface is effected by producing metal oxide nanoparticles in the coexistence of an organic modifying agent in a supercritical hydrothermal synthesis reaction field, thereby forming organically modified metal oxide nanoparticles wherein an optionally substituted or unsubstituted hydrocarbon group is bonded to the surface of said nanoparticle through a covalent bond.

34. The process according to claim 33, wherein the particle size of the generated particles is adjusted to a smaller particle size as compared with those where supercritical hydrothermal synthesis is performed in the absence of an organic modifying agent.

35. The process according to claim 28, wherein said hydrocarbon group is a long-chain hydrocarbon group having a chain having 1, 2, 3 or more carbon atoms.

36. The process according to claim 28, wherein said organic modifying agent is selected from the group consisting of an alcohol, an aldehyde, a carboxylic acid, an amine, a thiol, an amide, a ketone, an oxime, a phosgene, an enamine, an amino acid, a peptide and a sugar.

37. The process according to claim 28, wherein said solvent is selected from the group consisting of methanol, ethanol, propanol, i-propanol, butanol, butanol, t-butanol and ethylene glycol.

38. The process according to any of claim 28, wherein the reaction is performed in the coexistence of an acid.

39. The process according to claim 38, wherein the acid is selected from the group consisting of nitric acid, sulfuric acid, hydrochloric acid, bromic acid, formic acid, acetic acid, propionic acid and toluenesulfonic acid.

40. The process according to claim 28, wherein the reaction ratio of the organic modifying agent is regulated by controlling a factor selected from the group consisting of temperature, acid concentration and reaction time.

41. The process according to claim 28, wherein the average size of the nanoparticles is:
 (1) 100 nm or less;
 (2) 50 nm or less;
 (3) 20 nm or less;
 (4) 10 nm or less; or
 (5) 5 nm or less.

* * * * *